United States Patent
Lee et al.

(10) Patent No.: US 11,139,877 B2
(45) Date of Patent: Oct. 5, 2021

(54) APPARATUS AND METHOD FOR DETERMINING WHETHER TO PROVIDE A CSI REPORT

(71) Applicant: Sony Corporation, Tokyo (JP)

(72) Inventors: Moon-il Lee, Melville, NY (US); Janet A. Stern-Berkowitz, Melville, NY (US); Afshin Haghighat, Montreal (CA); Loic Canonne-Velasquez, Montreal (CA); Oghenekome Oteri, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 50 days.

(21) Appl. No.: 16/613,117

(22) PCT Filed: Jun. 12, 2018

(86) PCT No.: PCT/US2018/037083
§ 371 (c)(1),
(2) Date: Nov. 13, 2019

(87) PCT Pub. No.: WO2018/231812
PCT Pub. Date: Dec. 20, 2018

(65) Prior Publication Data
US 2020/0177254 A1  Jun. 4, 2020

Related U.S. Application Data

(60) Provisional application No. 62/565,687, filed on Sep. 29, 2017, provisional application No. 62/519,736, filed on Jun. 14, 2017.

(51) Int. Cl.
*H04B 7/06* (2006.01)
*H04W 76/27* (2018.01)
(Continued)

(52) U.S. Cl.
CPC .......... *H04B 7/0626* (2013.01); *H04B 7/063* (2013.01); *H04B 7/0632* (2013.01);
(Continued)

(58) Field of Classification Search
CPC .... H04B 7/0626; H04B 7/063; H04B 7/0632; H04B 7/0639; H04B 7/0643;
(Continued)

(56) References Cited

U.S. PATENT DOCUMENTS

2015/0124663 A1   5/2015   Chen et al.

OTHER PUBLICATIONS

International Search Report and Written Opinion dated Sep. 4, 2018 for PCT/US2018/037083 filed on Jun. 12, 2018, 13 pages.
(Continued)

*Primary Examiner* — Natasha W Cosme
(74) *Attorney, Agent, or Firm* — Xsensus, LLP

(57) ABSTRACT

Methods, apparatuses and systems are provided for transmission of a CSI report. A WTRU may receive an aperiodic CSI reporting request on a PDCCH. The WTRU may determine a time gap between a last symbol of the PDCCH of which the aperiodic CSI reporting request is received and a first uplink symbol of a designated uplink channel for transmission of a corresponding aperiodic CSI report. The determination of the time gap may include consideration of a timing advance value. A determination may be made as to whether a time threshold is shorter than the determined time gap. If the determined time gap is not shorter than the time threshold, the WTRU may transmit the CSI report. If the determined time gap is shorter than the threshold, the WTRU may not transmit the CSI report.

16 Claims, 14 Drawing Sheets

(51) Int. Cl.
*H04L 5/00* (2006.01)
*H04W 56/00* (2009.01)
*H04W 72/04* (2009.01)

(52) U.S. Cl.
CPC ......... *H04B 7/0639* (2013.01); *H04B 7/0643* (2013.01); *H04L 5/0051* (2013.01); *H04W 56/0045* (2013.01); *H04W 72/042* (2013.01); *H04W 76/27* (2018.02)

(58) Field of Classification Search
CPC ............. H04W 76/27; H04W 56/0045; H04W 72/042; H04L 5/0051
See application file for complete search history.

(56) References Cited

OTHER PUBLICATIONS

LG Electronics, "Discussion on CSI timing", 3GPP TSG RAN WGNR Ad Hoc Meeting, R1-1700473, Spokane, USA, Jan. 16-20, 2017, 5 pages.
LG Electronics, "Discussion on CSI framework for NR", 3GPP TSG RAN WG1 Meeting No. 88, R1-1702455, Athens, Greece, Feb. 13-17, 2017, 6 pages.
Qualcomm Incorporated, "Details of CSI framework", 3GPP TSG RAN WG1 No. 88bis, R1-1705584, Spokane, USA, Apr. 3-7, 2017, 5 pages.

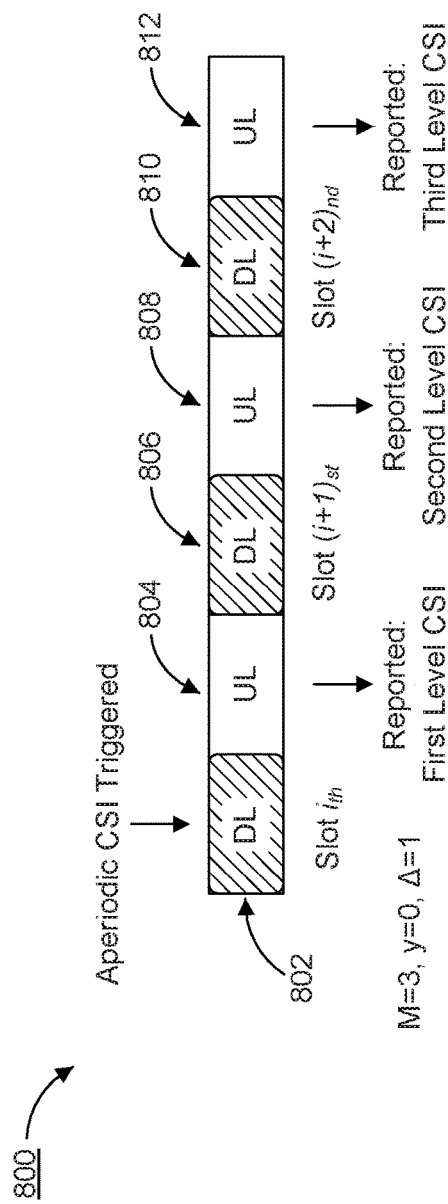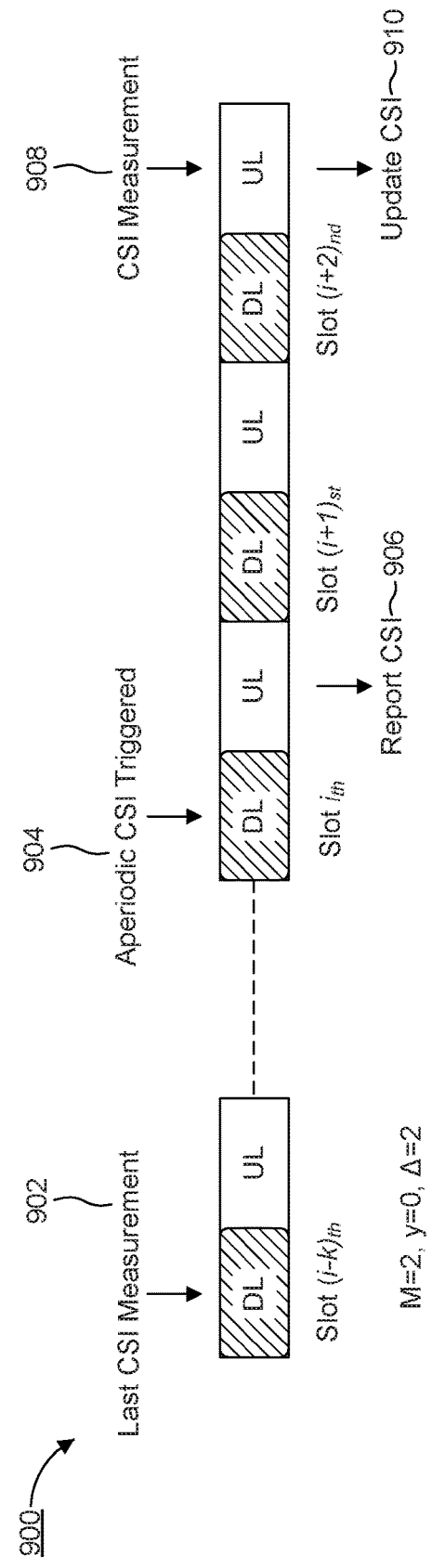

APPARATUS AND METHOD FOR DETERMINING WHETHER TO PROVIDE A CSI REPORT

CROSS REFERENCE TO RELATED APPLICATIONS

This application is based on PCT filing PCT/US2018/037083, filed Jun. 12, 2018, which claims the benefit of U.S. provisional application No. 62/519,736, filed Jun. 14, 2017 and the benefit of U.S. provisional application No. 62/565,687, filed Sep. 29, 2017, the entire contents of each are incorporated herein by reference.

SUMMARY

Channel state information (CSI) is an term used to refer to various types of indicators which a wireless transmit/receive unit (WTRU) may report to a base station. Some exemplary indicators include a channel quality indicator (CQI), a precoding matrix indicator (PMI), a precoding type indicator (PTI) and a rank indicator (RI). In Long Term Evolution (LTE) Release 10, CSI-reference signals (CSI-RS) were introduced to enable channel state measurement for 8-layer channel estimation. Reporting of CSI-RS may facilitate precoding functions of a base station, for example, an evolved Node B (eNB) or a next generation Node B (gNB), used to precode data or other transmissions to a WTRU.

CSI-RS transmissions may be sent in a periodic or aperiodic manner. In a periodic manner, CSI may be transmitted on designated resources at fixed or variable intervals. In an aperiodic reporting manner, an eNB or gNB may intermittently instruct a WTRU to report CSI at a unique time instance. Using downlink control information (DCI), the eNB or gNB may provide CSI parameters to the WTRU, the parameters used for calculating and/or determining when to calculate and transmit CSI. These parameters may specifically include timing related parameters to provide the WTRU with an explicit time or schedule for transmitting the CSI. In next generation systems, the CSI reporting timing may be shorter than that in legacy LTE systems. In this way, a WTRU may have less time to measure, calculate and report CSI than in legacy LTE systems. This may increase a cost or implementation complexity of a WTRU, since there may be less processing time available for the WTRU to conduct a CSI measurement prior to transmission of a corresponding report.

Methods, apparatuses and systems are provided for adaptively configuring and reporting CSI. The methods may be directed to multiple type (multi-type) CSI processing time determinations. For example, a set of CSI processing parameters, system parameters, WTRU capability, or numerology may be used to indicate or determine one or more types of a CSI processing time.

The methods disclosed are further directed to restrictions on CSI reporting timing and reporting type. For example, system parameters, WTRU capability or numerology may determine candidate values of CSI-RS transmission timing (hereinafter denoted as x, as shown in FIG. 3) or CSI reporting timing (hereinafter denoted as y, also as shown in FIG. 3). In addition or in the alternative, the candidate values of x or y may indicate or determine a supported set of CSI reporting types and configurations. The methods are also directed to a WTRU capability indication of CSI reporting timing, its associated CSI reporting types, and configurations.

The methods are also directed to dynamic indication of transmission and reception points (TRPs) for CSI reporting triggering using a set configuration for multi-operation. For example, multi-stage downlink control information (DCI) for an active TRP set indication and a CSI reporting timing indication may be provided to and utilized by a WTRU. In one example, a first stage DCI for CSI triggering indication of active TRPs may be sent to the WTRU and a second stage DCI for associated CSI reporting parameters for the TRPs may be sent to the WTRU. Methods directed to multi-level CSI reporting, including multiple level CSI reporting timings, associated CSI reporting types and configurations are disclosed herein.

Methods, apparatuses and systems are provided for transmission of a CSI report. A WTRU may receive an aperiodic CSI reporting request on a physical downlink control channel (PDCCH). The WTRU may determine a time gap between a last symbol of the PDCCH of which the aperiodic CSI reporting request is received and a first uplink symbol of a designated uplink channel for transmission of a corresponding aperiodic CSI report. The determination of the time gap may include consideration of a timing advance value. A determination may be made as to whether a time threshold is shorter than the determined time gap. If the determined time gap is not shorter than the time threshold, the WTRU may transmit the CSI report. If the determined time gap is shorter than the threshold, the WTRU may not transmit the CSI report.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 8 illustrates an example aperiodic multi-level CSI reporting process according to an embodiment;

FIG. 9 illustrates another example aperiodic multi-level CSI reporting process according to an embodiment;

DETAILED DESCRIPTION

Figure 1A:
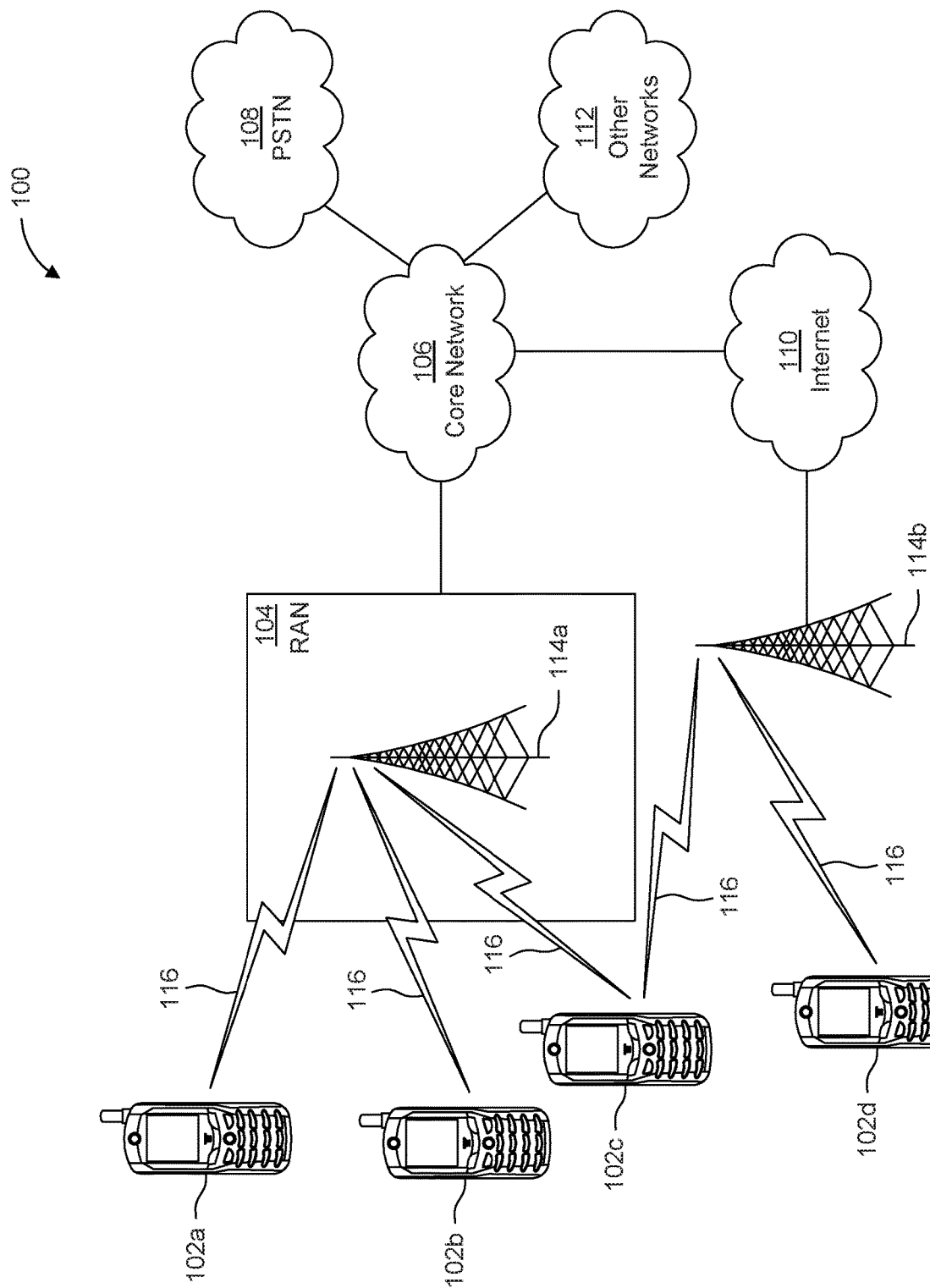
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, or network elements. Each of the WTRUs 102a, 102b, 102c, 102d may be any type of device configured to operate or communicate in a wireless environment. By way of example, the WTRUs 102a, 102b, 102c, 102d, any of which may be referred to as a "station" or a "STA", may be configured to transmit or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot or other wireless devices operating in an industrial or an automated processing chain contexts), a consumer electronics device, a device operating on commercial or industrial wireless networks, and the like. Any of the WTRUs 102a, 102b, 102c and 102d may be interchangeably referred to as a UE.

The communications systems 100 may also include a base station 114a or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, or the other networks 112. By way of example, the base stations 114a, 114b may be a base transceiver station (BTS), a Node-B, an eNode-B, a Home Node-B, a Home eNode-B, a gNodeB (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations or network elements.

The base station 114a may be part of the RAN 104/113, which may also include other base stations or network elements (not shown), such as a base station controller (BSC), a radio network controller (RNC), relay nodes, etc. The base station 114a or the base station 114b may be configured to transmit or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) or Evolved HSPA (HSPA+). HSPA may include High-Speed Downlink (DL) Packet Access (HSDPA) or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) or LTE-Advanced (LTE-A) or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., or perform high-level security functions, such as user authentication. Although not shown in FIG. 1A, it will be appreciated that the RAN 104/113 or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) or the internet protocol (IP) in the TCP/IP internet protocol suite. The networks 112 may include wired or wireless communications networks owned or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
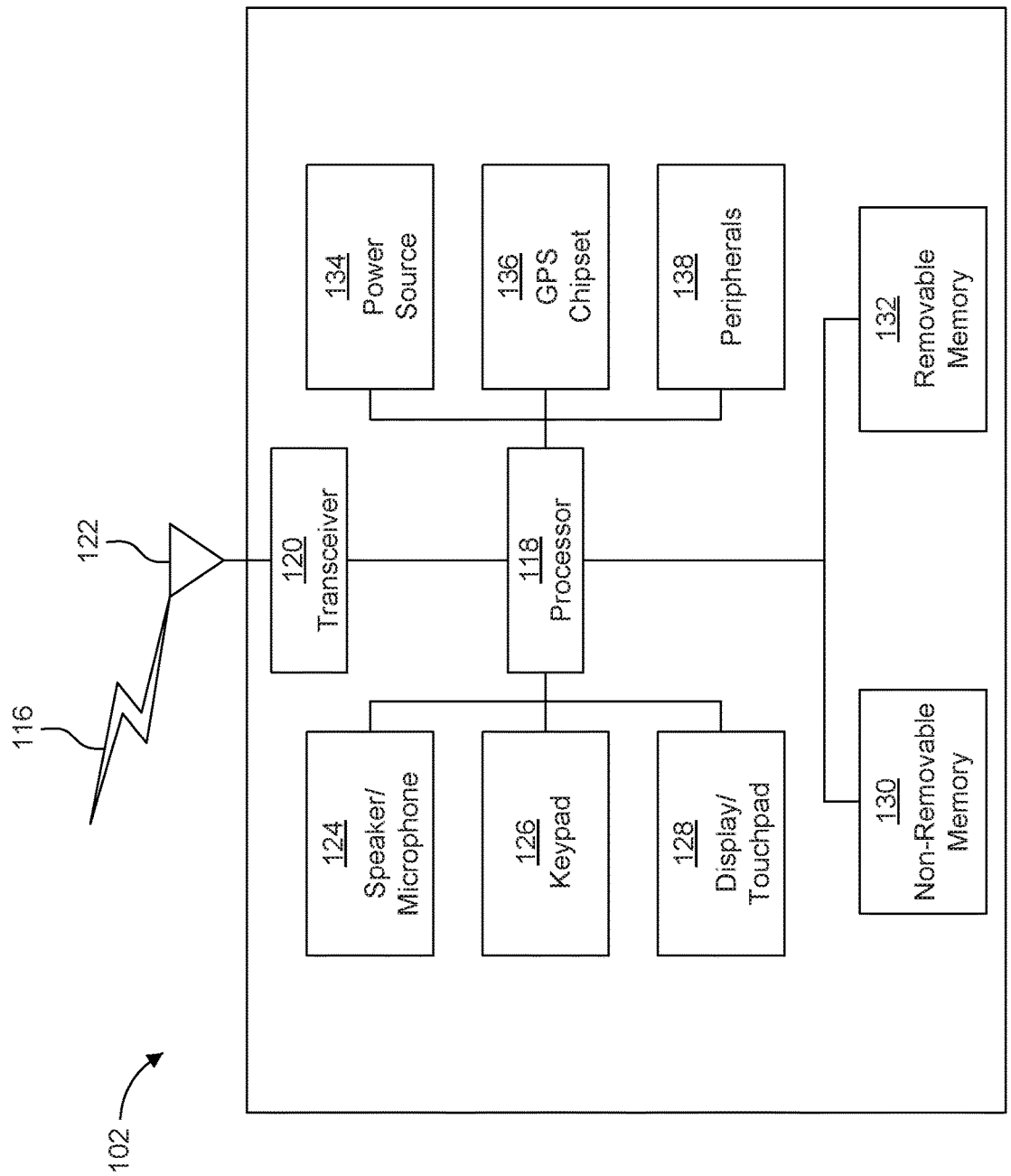
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAS) circuits, any other type of integrated circuit (IC), a state machine, and the like. The processor 118 may perform signal coding, data processing, power control, input/output processing, or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit or receive RF signals. In an embodiment, the transmit/receive element 122 may be an emitter/detector configured to transmit or receive IR, UV, or visible light signals, for example. In yet another embodiment, the transmit/receive element 122 may be configured to transmit or receive both RF and light signals. It will be appreciated that the transmit/receive element 122 may be configured to transmit or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, or the display/touchpad 128 (e.g., a liquid crystal display (LCD) display unit or organic light-emitting diode (OLED) display unit). The processor 118 may also output user data to the speaker/microphone 124, the keypad 126, or the display/touchpad 128. In addition, the processor 118 may access information from, and store data in, any type of suitable memory, such as the non-removable memory 130 or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software or hardware modules that provide additional features, functionality or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
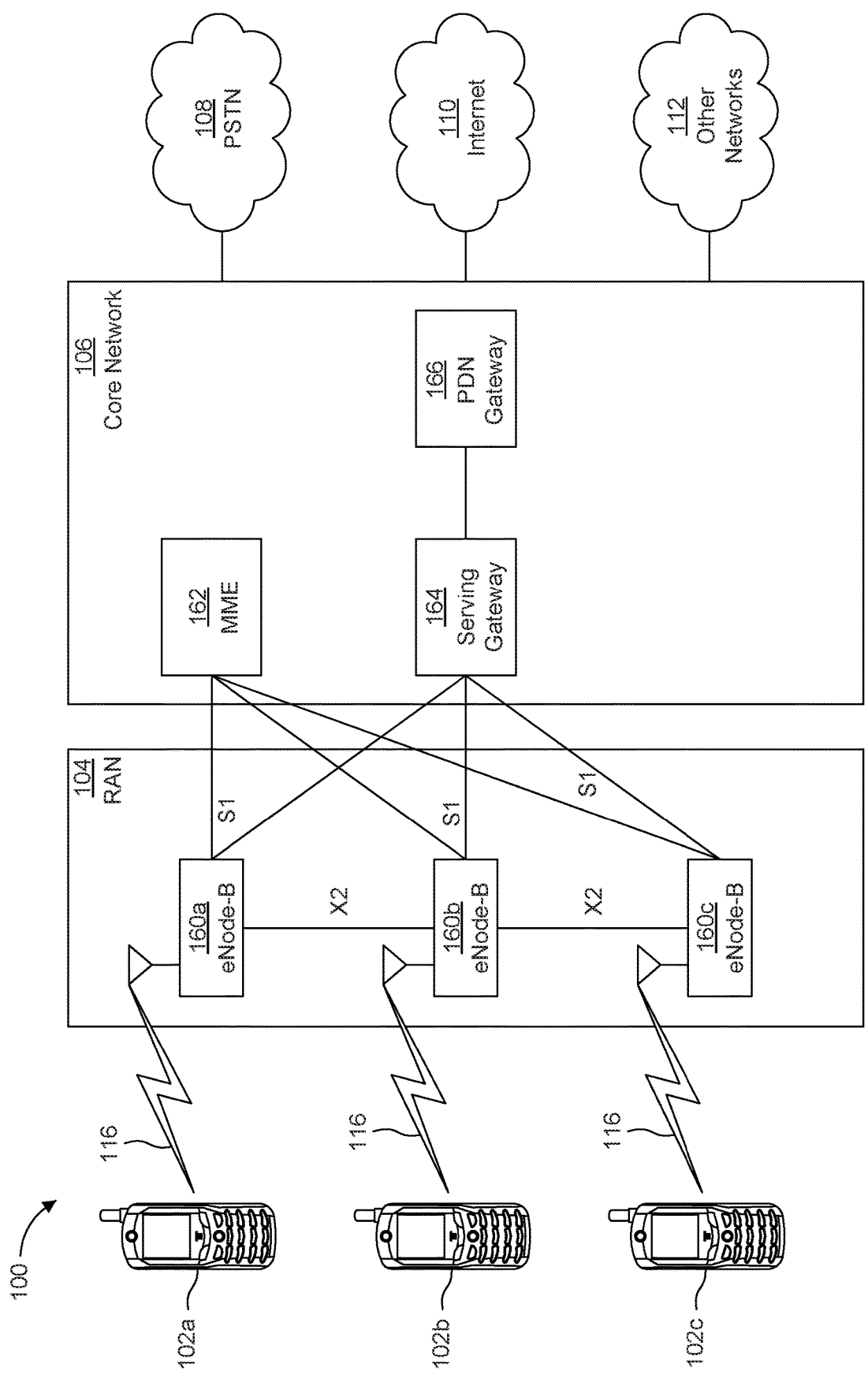
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired or wireless networks that are owned or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, or 160 MHz wide channels. The 40 MHz, or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80-80 configuration. For the 80-80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80-80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, or other channel bandwidth operating modes. Carrier sensing or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

Figure 1D:
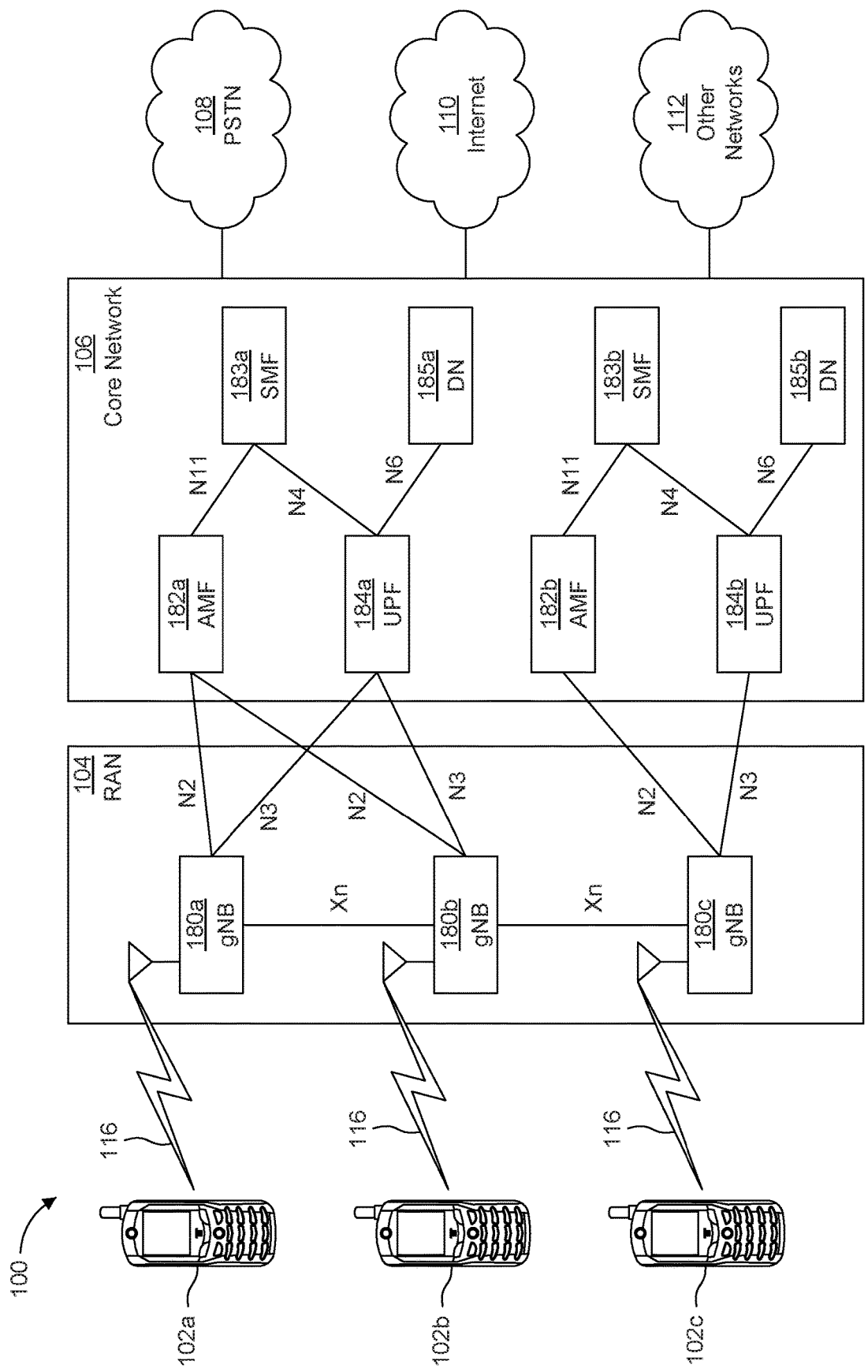
FIG. 1D is a system diagram illustrating a further example RAN and a further example CN that may be used within the communications system illustrated in FIG. 1A according to an embodiment.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code. FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to or receive signals from the gNBs 180a, 180b, 180c. Thus, the gNB 180a, for example, may use multiple antennas to transmit wireless signals to, or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (or gNB 180c).

The WTRUs 102a, 102b, 102c may communicate with gNBs 180a, 180b, 180c using transmissions associated with a scalable numerology. For example, the OFDM symbol spacing oror OFDM subcarrier spacing may vary for different transmissions, different cells, or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols or lasting varying lengths of absolute time). A variable subcarrier spacing may be employed, using for example one or more of a 15 KHz, 30 kHz, 60 kHz or 120 kHz subcarrier spacing.

The gNBs 180a, 180b, 180c may be configured to communicate with the WTRUs 102a, 102b, 102c in a standalone configuration or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the preceding elements are depicted as part of the CN 115, it will be appreciated that any of these elements may be owned or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, or the like. The AMF 162 may provide a control plane function for switching between the RAN 113 and other RANs (not shown) that employ other radio technologies, such as LTE, LTE-A, LTE-A Pro, or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired or wireless networks that are owned or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, or any other device(s) described herein, may be performed by one or more emulation devices (not shown). The emulation devices may be one or more devices configured to emulate one or more, or all, of the functions described herein. For example, the emulation devices may be used to test other devices or to simulate network or WTRU functions.

The emulation devices may be designed to implement one or more tests of other devices in a lab environment or in an operator network environment. For example, the one or more emulation devices may perform the one or more, or all, functions while being fully or partially implemented or deployed as part of a wired or wireless communication network in order to test other devices within the communication network. The one or more emulation devices may perform the one or more, or all, functions while being temporarily implemented or deployed as part of a wired or wireless communication network. The emulation device may be directly coupled to another device for purposes of testing or may performing testing using over-the-air wireless communications.

The one or more emulation devices may perform the one or more, including all, functions while not being implemented or deployed as part of a wired or wireless communication network. For example, the emulation devices may be utilized in a testing scenario in a testing laboratory or a non-deployed (e.g., testing) wired or wireless communication network in order to implement testing of one or more components. The one or more emulation devices may be test equipment. Direct RF coupling or wireless communications via RF circuitry (e.g., which may include one or more antennas) may be used by the emulation devices to transmit or receive data.

Figure 2:
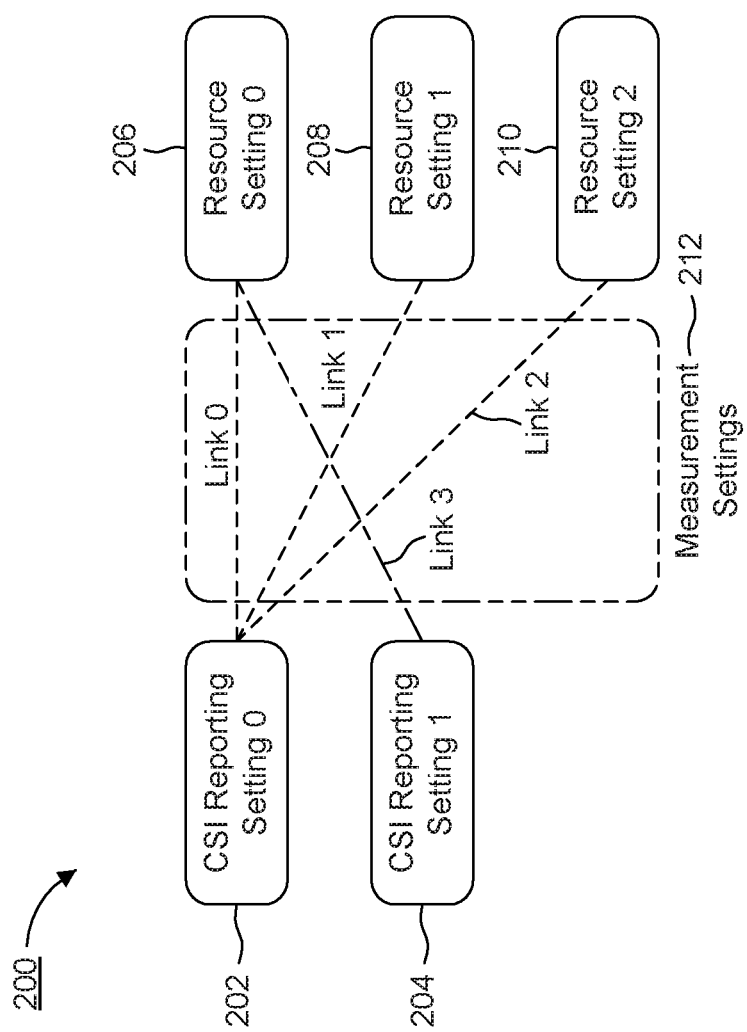
FIG. 2 illustrates a block diagram of an example configuration for channel state information (CSI) reporting settings, resource settings and links.

FIG. 2 shows a block diagram 200 of an exemplary configuration for channel state information (CSI) reporting settings, resource settings and links according to an embodiment. In particular, a WTRU may be configured with one or more CSI measurement settings by receiving downlink control information (DCI) from a cell, an eNodeB or a gNodeB (gNB). For example, the CSI reporting setting 0 202 may link to the resource setting 0 206, for example, non-zero power (NZP) CSI-RS resources, resource setting 1 208, for example, zero power (ZP) CSI-RS resources, and/or resource setting 2 210, for example, NZP CSI-RS resources, via link 0, link 1, or link 2, respectively. In addition, the CSI reporting setting 1 204 may link to the resource setting 0 206 via link 3. CSI measurement settings 212 may provide N≥1 CSI reporting settings (in FIG. 2, N=2), M≥1 resource settings (in FIG. 2, M=3). The CSI measurement settings 212 may provide or direct the linkage between CSI reporting settings and one or more resource settings. Measurement settings 212 may link the N CSI reporting settings with the M resource settings, as shown in FIG. 2. Measurement settings 212 may be stored in a complex data structure such as a database, stored as a low complex data structure such as a bitmap or another data structure.

A CSI reporting setting may include one or more of the following: a time-domain behavior, for example, aperiodic or periodic/semi-persistent, a frequency-granularity, for example, at least for precoding matrix indicator (PMI) and channel quality indicator (CQI), and a CSI reporting type, for example, PMI, CQI, RI, CSI-RS resource index (CRI). If PMI is to be reported, the CSI reporting setting may also include PMI Type (Type I or II) and a codebook configuration. A frequency granularity include at least one of wideband, subband, and partial band, wherein wideband may be referred to as all PRBs of operating bandwidth and partial band may be referred to as a subset of PRBs in the operating bandwidth. The number of CSI-RS ports should be less than a total number of antennas. In one example, CSI reporting may be for 4 CSI-RS ports.

A codebook may refer to a set of precoding matrices. One purpose of measuring and reporting CSI by a WTRU is to provide an estimate of the channel quality and provide a recommendation of a proper precoding matrix to a network. Thus, a CSI estimation and report may be related to a precoding matrix selection by the WTRU. There may be several different sets of precoding matrices and different precoding matrix sets (a set may be referred to as a "codebook") used for different transmission conditions, more specifically, different transmission modes. Precoding may be analog and/or digital based, may refer to single stream or multiple stream beamforming and may be multiple antenna or single antenna based.

Codebooks may include Type I codebooks, for example standard resolution CSI feedback or single-panel and multi-panel. Other Type II codebooks may include high resolution CSI feedback targeting MU-MIMO based on non-precoded and precoded CSI-RS.

A resource setting may provide information with respect to one or more of the following: a time-domain behavior which may be aperiodic or periodic/semi-persistent; a reference symbol (RS) type, for example, for channel measurement or interference measurement); and one or more (S≥1) resource sets which may each contain Ks resources (or Ks CSI-RS resources). Ks may be used to represent the number of CSI-RS resources configured. A CSI measurement setting includes at least one of a CSI reporting setting and a resource setting. In addition, with respect to a CQI, a setting corresponding to a reference transmission scheme (or method) may be provided. One or more of the following frequency granularities may be supported and indicated for CSI reporting for a component carrier: wideband CSI, partial band CSI, and/or subband CSI. Hereafter, the terms subframe and slot may be interchangeably used.

In LTE, a fixed timing for aperiodic CSI reporting has been used. A WTRU in LTE receives an aperiodic CSI trigger at subframe n, the WTRU reports corresponding CSI at subframe n+k. For FDD, k equals 4 (k=4). This setting has been determined based on a worst case of CSI processing time. In new radio (NR), a flexible aperiodic CSI reporting timing is used. A WTRU in NR receives an aperiodic CSI trigger at slot n, the WTRU reports a corresponding CSI at slot n+k, where k is a flexible value and may be indicated in an associated DCI. A value smaller than 4, for example, k∈{0, 1, 2, 3}, may be used. Thus, CSI processing time may be reduced as smaller k values are used. A WTRU in NR may not report a requested CSI due to a shorter processing time. No WTRU behavior has been defined when the WTRU cannot measure a requested CSI due to a short CSI reporting timing. This presents a potential problem as signaling between a WTRU and a network may be left undefined.

Figure 3:
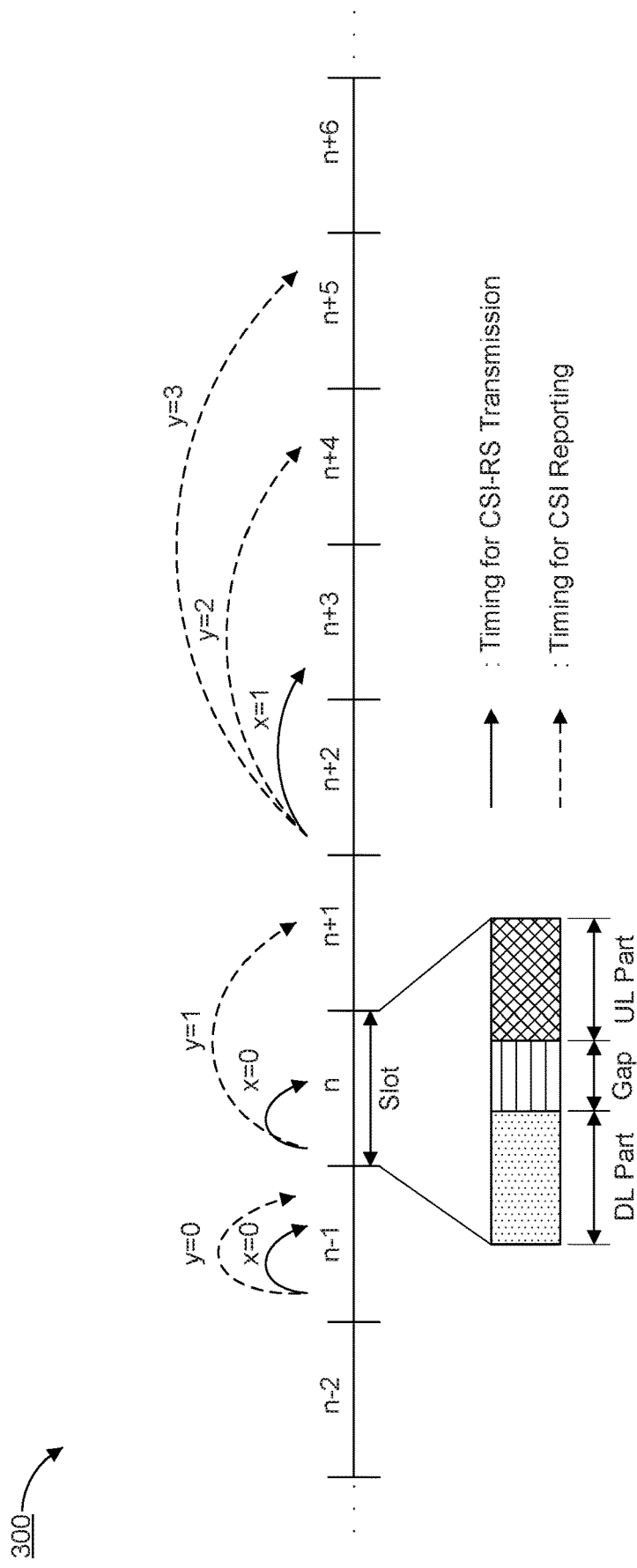
FIG. 3 illustrates examples of potential aperiodic CSI-reference signal (CSI-RS) transmissions and aperiodic CSI reporting timings in new radio (NR)

FIG. 3 illustrates a number of examples 300 of aperiodic CSI-RS transmissions and timings of aperiodic CSI reporting. In one embodiment, these examples may apply to new radio (NR). These examples may apply when aperiodic CSI-RS and aperiodic CSI reporting is or are triggered, indicated, or requested in a slot, for instance, slot n−2, n−1, . . . , n+5, n+6. In FIG. 3, solid lines with the annotations x=0 and x=1 illustrate timings for aperiodic CSI-RS transmissions. If an aperiodic CSI-RS is triggered in a slot #m, for instance n−1, n, n+2, the triggered aperiodic CSI-RS may be transmitted in a slot #m+x, where the x is indicated in the associated DCI. For example, if an aperiodic CSI-RS is triggered in the slot n+2 and x=1 is indicated in the associated DCI, the triggered aperiodic CSI-RS may be transmitted in the slot n+3, e.g. n+2+1.

In FIG. 3, dotted lines with the annotations y=0, y=1, y=2, and y=3 illustrate timings for aperiodic CSI reporting. If an aperiodic CSI reporting is triggered in a slot #m, such as n−1, n, n+1, n+2, etc., the triggered aperiodic CSI reporting may be transmitted in a slot #m+y, where the y is indicated in the associated DCI. For example, an aperiodic CSI-RS is triggered in the slot n+2 and y=2 is indicated in the associated DCI, thus the triggered aperiodic CSI-RS may be transmitted in the slot n+4, e.g. n+2+2. A WTRU may be triggered to report an aperiodic CSI which may be measured based on a periodic, a semi-persistent, or an aperiodic CSI-RS.

In another example shown in FIG. 3, at slot n−1, in a DL part of the slot, an aperiodic CSI reporting is triggered. When x=0 and y=0, a CSI-RS transmission and CSI reporting may be sent in the UL part of the same slot. In slot n, for example, when x=0 and y=1, CSI-RS may be sent in the UL part of slot n, while CSI reporting may occur at n+1. There may be a gap between the DL part and UL part of a subframe. It should be noted that for a trigger (or a triggering message) received in slot #m, a corresponding CSI-RS transmission is sent in slot #m+x. For CSI reporting, for a trigger received in slot #m, the corresponding report may be sent in slot #m+y. This example should be taken as a non limiting example and other constants or variables may be added or removed without deviation from the concept described.

In some examples described herein, terms for a timing advance (TA), TA value, applied TA, WTRU receive-transmit (Rx-Tx) time difference, Rx-Tx time difference, and uplinkldownlink (UL/DL) time difference may be used interchangeably or substituted for each other and still be consistent with the provisions herein. The terms TRP, cell, eNB, network and gNB may be used interchangeably herein. The term gNB may refer to a 5G base station or a new radio (NR) base station. As used herein, UL and DL are used as non-limiting examples of transmission directions. Other transmission/reception directions, for example the term sidelink, may be substituted for the UL or DL and still be consistent with the examples and embodiments described herein. It should be noted that the term gNB may refer to a 3GPP 5G Next Generation base station which supports the 5G New Radio. However, will be evident to one skilled in the art that gNB technology will evolve over time and this disclosure is meant to relate to gNB and equivalents thereof, hereby developed now or in the future.

A WTRU may adjust its reception or transmission timing, based on a received timing, for example, a received DL timing or UL timing of a cell or other node. For example, a WTRU may synchronize its reception or transmission timing to the received timing using one or more of a frame timing, subframe timing, sync burst timing, slot timing, or the like of a given cell or cells. The WTRU may do so using a synchronization signal, for example, primary synchronization signal (PSS), a secondary synchronization signal (SSS), a physical broadcast channel (PHCH) signal, a synchronization signal and PBCH block (SS/PBCH block), or any other received signal for that matter.

The timing boundaries received by the WTRU may vary over time due to WTRU motion or other factors like oscillator drift. Accordingly, a WTRU may adjust its reception or transmission timing. For an UL transmission, a WTRU may apply a timing advance (TA). For example, a WTRU may start a transmission of an UL time unit based on some amount of time like an applied TA before a start of the corresponding DL time unit. A WTRU may receive TA commands from a cell or a TRP with which the WTRU may communicate. A WTRU may apply one or more received TA commands to adjust or update its UL timing. A WTRU may receive the TA in a random access response (RAR) from a TRP. The WTRU may be in communication with multiple TRPs, and thus have more than one stored TA setting.

An applied TA may be a TA that a WTRU applies to adjust its UL timing where the adjustment may be relative to its DL timing. The applied TA may not be the same as a sum of one, more, or all TA commands transmitted by a TRP to the WTRU, because the WTRU may miss a TA command from the TRP. A TA command sum may be the sum of one, more, or all TA commands transmitted to or received by a WTRU. In some examples, a TA may be used to represent the applied TA or the TA command sum. A TA may be indicated via sequential signals or received substantially all at once. In one example, a TA command to decibel change may be the following {0, 1, 2, 3, 4, 5, 6, 7} to {−6, −4, −2, 0, 2, 4, 6, 8}. Other TA indications may be more or less granular or even variable in nature.

An Rx-Tx time difference may refer to a time difference between a receive timing and a transmission timing of a WTRU. The Rx-Tx time difference such as a WTRU Rx-Tx time difference may be different from a value of an applied TA. That is, the Rx-Tx time difference may be an applied TA plus or minus an offset, such as WTRU movement, oscillator drift, or errors in applying TA. A WTRU may adjust its Rx-Tx time difference to be within a threshold or tolerance value of an applied TA.

Figure 4:
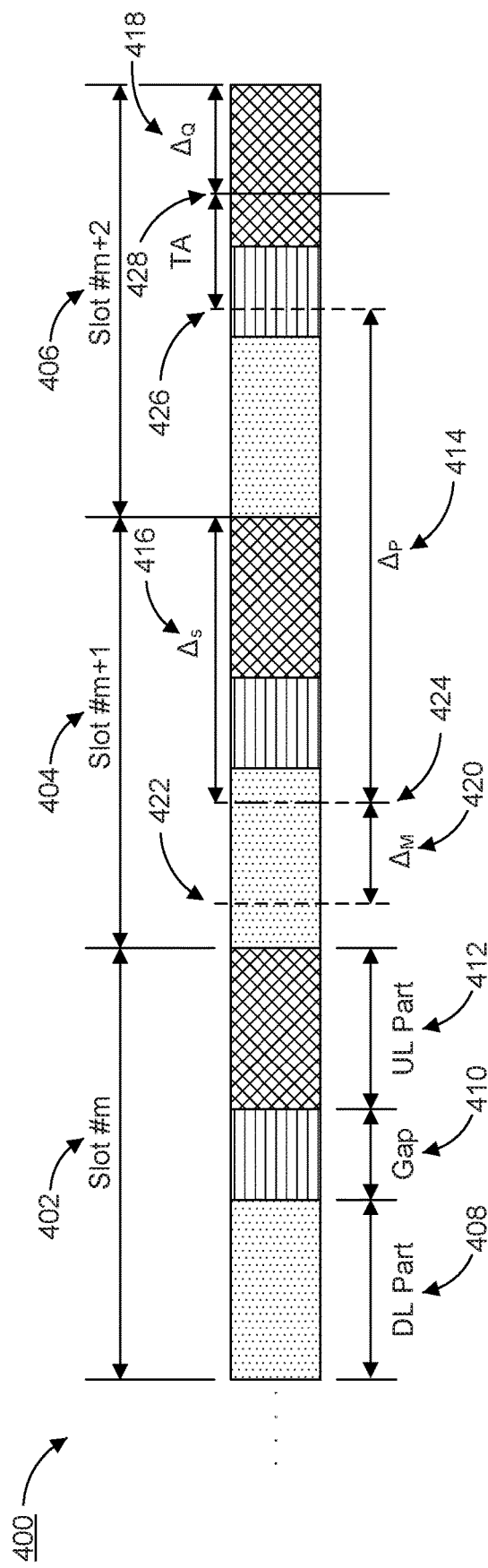
FIG. 4 illustrates transmission time slots of which example CSI processing time parameters based on aperiodic CSI-RS and CSI reporting are shown in one embodiment.

FIG. 4 illustrates example CSI processing time parameters based on aperiodic CSI-RS and CSI reporting according to an embodiment 400. A CSI processing time may be a time window during which a WTRU may measure, calculate, or determine at least one CSI to report. As used herein, the term CSI processing time may be interchangeable with CSI measurement time; CSI measurement window; available processing time for at least one CSI measurement; a (time) gap between CSI reporting trigger time and CSI reporting time; a gap between CSI reporting trigger slot and CSI reporting slot; a gap between a CSI-RS transmission and its associated CSI reporting time; and a gap between CSI reporting trigger time and CSI reporting time. A CSI processing time may be referred to as $\Delta P$ in shorthand. A statement referring to a gap, a time gap, a time difference may taken interchangeably herein. Aperiodic CSI-RS may represent the latest CSI-RS of a periodic CSI-RS or semi-persistent CSI-RS transmitted before slot #m−k, when a WTRU receives an aperiodic CSI reporting trigger at the slot #m. CSI report and CSI reporting may be used interchangeably herein.

A CSI processing time may be based on a number of OFDM symbols, wherein the last symbol (e.g., the last symbol location) of a received NR physical downlink control channel (NR-PDCCH) and the first symbol (e.g., the first symbol location) of the NR-PUCCH or the NR physical uplink shared channel (NR-PUSCH) that may carry a corresponding CSI reporting value or values may determine the CSI processing time. The NR-PDCCH may carry a DCI that may trigger aperiodic CSI reporting. In addition, a timing advance value may be also considered for the CSI processing time.

Multiple types of CSI processing time may be used. For example, a first, a second, and a third type of CSI processing time may be based on; an aperiodic CSI reporting and its associated aperiodic CSI-RS transmission; an aperiodic CSI reporting and its associated periodic CSI-RS transmission; and an aperiodic CSI reporting and its associated semi-persistent CSI-RS transmission, respectively. Other CSI reporting types may also have associated CSI processing times.

Associated CSI-RS types, a higher layer signaling, a WTRU capacity, a gap between CSI-RS transmissions and CSI reporting, and several CSI processing time parameters may decide, provide, indicate or configure the CSI processing time, as disclosed herein.

These types of CSI processing times may be determined based on an associated CSI-RS type, which may be based on at least one of the following: time-domain behavior (for example, periodic, semi-persistent, and aperiodic); transmission bandwidth (for example, wideband, subband, partial band or bandwidth part); a time location of the last CSI-RS transmission available; a number of antenna ports of the associated CSI-RS; and a purpose of CSI-RS (for example, CSI acquisition or beam management). The associated CSI reporting parameters (for example, reporting of CRI or reporting of PMI/CQI/RI) may determine a reason or purpose of CSI-RS. The purpose may also be in line with a quantity of feedback reported. In one embodiment, a feedback quantity, for example PMI/CQI/RI or CRI/RI/CQI (for example. without PMI) may dictate a CSI processing time. It may be possible to report one feedback quantity but not another feedback quantity. In this case, a WTRU may simply drop feedback or alternatively, may scale the feedback quantity.

In one embodiment, a computation delay, for example, a CSI processing time threshold may be a function of the parameters Z, Z'. The threshold may be a function of the type of CSI to be reported and the subcarrier spacing.

A type of CSI processing time may be configured via higher layer signaling, for example MAC, RLC or PDCP signaling. A WTRU capability may also indicate or provide a type of CSI processing time. For example, a WTRU may report one or more types of CSI processing time supported as a WTRU capability to the TRP, and the TRP may determine the type of CSI processing time and configure the WTRU accordingly. The WTRU category may determine the type of CSI processing time. The CSI processing time may be determined based on the gap between the time at which a(n) (aperiodic) CSI-RS is transmitted and the time at which aperiodic CSI is reported.

The CSI processing time may be determined based on one or more CSI processing time parameters. FIG. 4 illustrates an example 400 showing exemplary CSI processing time parameters when aperiodic CSI-RS and aperiodic CSI reporting are used. In FIG. 4 and hereinafter, $\Delta_P$ refers to the CSI processing time and $\Delta_S$, $\Delta_Q$, $\Delta_m$, and TA refer to other CSI processing time parameters defined below.

The following one or more CSI processing time parameters may be used to determine the CSI processing time ($\Delta_P$). The parameters may include a time location, for example, a time delta from a start time or a reference time of the associated CSI-RS transmitted (x or m+x) from which a WTRU may estimate, measure, or determine CSI reporting values or parameters. The parameters may include a time location, for example, a time delta from a start or reference time of when the CSI reporting may be transmitted (y or m+y). The parameters may also include a time location of when aperiodic CSI-RS or aperiodic CSI reporting is triggered. For example, a time location in which a WTRU may receive a DCI which triggers aperiodic CSI-RS or aperiodic CSI reporting ($\Delta_m$). Another parameter may be a time difference between a slot ending boundary and the time location of when a CSI-RS is transmitted within the slot ($\Delta_S$). Another parameter may include a time difference between a slot ending boundary and the time location of when a CSI reporting is transmitted within the slot ($\Delta_Q$). Another parameter considered may be a time difference between the time location of an NR physical downlink control channel (NR-PDCCH) (e.g., a NR-PDCCH carrying a DCI including a trigger for a CSI-RS) transmitted within a slot and the time location of when a CSI-RS is transmitted within the same slot ($\Delta_m$). Another parameter considered may be a TA value such as an applied TA, for example, the TA of FIG. 4. Another parameter may be a time difference between a receive timing and transmit timing, for example, a WTRU Rx-Tx time difference that may or may not be the same value as the TA value of FIG. 4. A processing time of NR-PDCCH ($\Delta_{PDCCH}$) may also be a parameter to consider.

FIG. 4 shows three slots 402-406. Each slot may comprise a DL part 408, gap 410 and UL part 412. In slot #m+1 404, a DCI for aperiodic CSI-RS Tx is received at time 422. The period between when the DCI is received 422 and a time 424 in which a CSI-RS is transmitted is referred to as $\Delta_m$ 420. The WTRU may process the CSI during $\Delta_P$ 414 between the time 424 which the CSI-RS is transmitted and a time 426 in which the WTRU reports the triggered aperiodic CSI with a timing advance. At time 428 the WTRU actually transmits the aperiodic CSI, e.g. after the timing advance transmission. The period after the TA is referred to as $\Delta_Q$ 418.

A set of CSI processing time parameters may determine or be used to calculate the CSI processing time. The set of CSI processing time parameters may be based on the type of CSI processing time, which is determined based on the associated CSI-RS type (e.g., periodic, aperiodic, or semi-persistent CSI-RS). For example, the type of CSI processing time may be determined based on: a first set of CSI processing parameters ({y}); a second set of CSI processing parameters ({x, y}); and a third set of CSI processing parameters ({x, y, $\Delta_S$, $\Delta_Q$}).

One or more of following parameters may determine the set of CSI processing time parameters: system parameters, for example, cell-ID, slot index, radio frame index, number of SS blocks used; WTRU-specific parameters, for example, WTRU-ID, number of CSI-RS resources configured, etc.; numerology, for example, subcarrier spacing, carrier frequency, TTI length, CP length, etc.; slot structure related information, for example, number of symbols used for downlink part, gap, uplink part, location of downlink control channel; a set of candidate values configured for a time location of the associated CSI-RS transmission, for example, a first set: x={0, 1, 2}, a second set: x={0}); a set of candidate values configured for a time location of the CSI reporting (e.g., a first set: y={0, 1, 2, 3, 4}, a second set: y={2, 4}, a third set: y={4}). A CSI processing time may be calculated from the beginning of a symbol, for example at a cyclic prefix of the symbol.

A WTRU capability may determine the set of CSI processing time parameters. For example, a WTRU may report or indicate one or more CSI processing time parameters (for example, by the WTRU or for the WTRU by the TRP). In addition, a WTRU may be triggered or requested to report the CSI processing time parameters that may be needed or used for a CSI processing time determination by the TRP.

A slot level may refer to whether or not a WTRU may be able to consider parameters based on a slot in comparison to a smaller symbol level, or a larger sub-frame or frame level. A slot level as known by a WTRU or TRP may determine a set of one or more CSI processing time parameters. Other parameters may be determined without consideration of the slot level. For example, when an aperiodic CSI reporting or an aperiodic CSI-RS is triggered at slot #m, the associated CSI-RS may be transmitted (or received by a WTRU) at slot #m+x. The CSI may be reported by the WTRU at slot #m+y. The CSI processing time may be determined based on (the time difference between) the slot at which the associated CSI-RS is transmitted (m+x) and the slot at which the CSI is reported by the WTRU (m+y). The CSI processing time may be the gap $\Delta_P$, where $\Delta_P=(m+y)-(m+x)=y-x$.

A symbol level (e.g., an OFDM symbol or a DFT-s-OFDM symbol) or a sample level may determine or provide for a set of CSI processing time parameters. For example, when the associated CSI-RS is transmitted at or near the beginning of a slot (e.g., $\Delta_S<1$ slot), such as in the first or second symbol of the slot, there may be additional time gap within the slot. If the CSI is reported at or near the end of the slot (e.g., $\Delta_Q<1$ slot), such as at the last or next to last symbol of the slot, there may be additional time gap within the slot. The CSI processing time or gap may be determined as $\Delta_P=-(m+x-1-\Delta_S)+(m+y-1-\Delta_Q)=(y-x)+(\Delta_S-\Delta_Q)$. When x=y, there may be a non-zero CSI processing time (i.e., $\Delta_P=\Delta_S-\Delta_Q$).

If multiple associated CSI-RSs are transmitted, the smallest value (or the largest value) of $\Delta_S$ may be used. Additionally, if multiple CSI reporting timings are used, the largest value (or the smallest value) of $\Delta_Q$ may be used. Alternatively, CSI processing time may be calculated for each CSI reporting instance, based on a $\Delta_Q$ value.

A CSI processing time may be reduced or may be additionally reduced based on a TA or a new radio (NR) physical downlink control channel (NR-PDCCH) processing time. A TA, for instance, an applied TA, may reduce the CSI processing time. In one example, a CSI processing time may refer to a calculated or determined CSI processing time. The TA value, for example, an applied TA value or an Rx-Tx time difference value, may be reported or indicated by the WTRU to a TRP or by a gNB when a CSI processing time such as a calculated or determined CSI processing time is less than a threshold that may be (pre)determined. A WTRU may calculate, determine, or report the TA value. Other processing time values may be reported or indicated from a TRP to a WTRU.

A WTRU may determine an NR-PDCCH processing time ($\Delta_{PDCCH}$), which may be considered by the WTRU or the gNB in a determination of CSI processing time. If the NR-PDCCH processing time is greater than (and/or equal to) a threshold or a gap ($\Delta_M$) between a time location at which NR-PDCCH is transmitted and another time location at which aperiodic CSI-RS is transmitted, the NR-PDCCH processing time may be considered in the determination of the CSI processing time. If the NR-PDCCH processing time is less than, or equal to, the threshold or the gap ($\Delta_M$), the NR-PDCCH processing time may not be used in a determination. This may be determined on a case by case basis.

The NR-PDCCH processing time may be reported by the WTRU as a WTRU capability when a determined CSI processing time is less than a predetermined threshold. The NR-PDCCH processing time may be determined as a function of one or more of the number of search spaces configured, number of control resource sets (CORESETs) configured, number of component carriers, number of CCEs for channel estimation, and the number (or total number) of blind decoding of NR-PDCCH candidates within a slot. A number of REs or REG bundles for NR-PDCCH to monitor in a slot may also be considered.

According to an embodiment, an exemplary CSI reporting timing and type restriction are described herein. One or more sets of candidate values of CSI reporting timing (y in FIG. 3) may be used. For example, a first set of candidate values of y may be {0, 1, 2, 3, 4}, a second set of candidate values of y may be {2, 4}, a third set of candidate values of y may be {4}, among others and not limited thereto. The set of candidate values of y may be determined based on the following parameters.

The candidate values of y may be configured via higher layer signaling, for example MAC, RRC, RLC or PDCP signaling. Candidate values of y may be determined based on one or more of system parameters, WTRU-specific parameters, numerology, service type (for example, eMBB, URLLC, and mMTC) and slot structure. For example, NR-PDCCH type or NR-PDCCH resource configuration (for example, a CORESET configuration) may determine the service type.

The candidate values of y may be determined as a function of a TA value for a WTRU (for example, a TA command sum (which may be positive or negative in some embodiments) for the WTRU or a TA reported by the WTRU such as an applied TA or an Rx-Tx time difference) or of a maximum TA value allowed or used in a cell or by a TRP. For example, a first set or a second set of candidate y values may be used when a TA value for a WTRU is less than (and/or equal to) or higher than a threshold, respectively. In another example, a maximum TA value used in a cell may determine the candidate values of y, where the maximum value of the used, allowed, or determined TA may be indicated in a higher layer signal such as remaining minimum system information (RMSI), other system information (OSI), or a WTRU-specific radio resource control (RRC) signal.

The number of used or determined candidate values may provide for a number of bits (or code points) to indicate a y value. A slot type (for example, a slot or mini slot) or the number of symbols used in a slot may define the candidate values of y. For example, a first set or second set of candidate values may be used if the number of symbols within a slot is lower or higher than a threshold, respectively. The candidate values of x (timing for CSI-RS, as shown in FIG. 3) may determine the candidate values of y (timing for CSI reporting, as shown in FIG. 3), for example, as a function of the minimum (or maximum) candidate values of x. For example, a minimum (or maximum) candidate value of x may determine the candidate values of y with offset values. For example, a set of offset values {a1, a2, a3, a4} may be used with a minimum (or maximum) x value (e.g., b1). The resulting set of candidate values of y may be {a1+b1, a2+b1, a3+b1, a4+b1} when the offset values may be {a1=0, a2=1, a3=2, a4=3}.

The candidate values of x may determine the candidate values of y, when an offset value ($\Delta$OFF) may be used for the candidate values of x. For example, if the candidate values of x are {b1, b2, b3, b4}, the candidate values of y may be {b1+$\Delta$OFF, b2+$\Delta$OFF, b3+$\Delta$OFF, b4+$\Delta$OFF}. The offset value may be determined based on a WTRU capability. The $\Delta$OFF value may be transmitted in advance, for example in a registration procedure. Alternatively, ΔOFF may be signaled to the WTRU based on a capability indicated during registration.

The candidate values of x may determine the candidate values of y, when a set of candidate x values may have a corresponding set of candidate y values. For example, if a set of candidate x values is determined, a configured or predefined table or rule may determine the set of candidate y values, and vice versa. A table may be provided in a database, bitmap or other data structure.

One or more CSI reporting types, CSI reporting settings or CSI reporting configurations may determine the candidate values of y. For example, a first set or a second set of candidate y values may be used for a first or a second CSI reporting type, respectively.

The CSI reporting type may be a type of CSI included in the CSI report. A CSI reporting type may include at least one of the following: CSI reporting parameters including: PMI, CQI, RI, CRI; a type of codebook for example CSI Type I or CSI Type II codebooks, where the CSI Type I codebook may be used for up to 8 layers and the CSI Type II codebook may be used for up to 2 layers; a bandwidth of a CSI reporting parameter such as wideband, subband, or bandwidth part; and a transmission mode such as SU-MIMO, MU-MIMO, open-loop, closed-loop, or semi-open-loop.

A CSI reporting configuration may include at least one of following: a number of subbands or bandwidth parts; a number of antenna ports of a CSI-RS resource; a number of CSI-RS resources which may need to be measured at the same time or which may be associated with the CSI reporting; a maximum number of rank associated with a CSI-RS resource; a number of resource settings associated with the CSI reporting (e.g., CSI reporting at the same time); a number of links (e.g., links between CSI reporting settings and resource settings) which may be associated with the CSI reporting; a codebook subset restriction level (e.g., a number of codewords in a codebook which may need to be searched for PMI reporting); and/or a rank subset restriction level (e.g., a candidate rank values may be restricted).

A number of carriers (e.g., for carrier aggregation or dual connectivity) may be used to determine the candidate values of y. For example, the number of carriers may be the number of carriers which requires CSI reporting at the same time.

In another example, a set of CSI reporting types, configurations, or parts may be determined based on the determined CSI processing time. Table 1 shows an example of allowed CSI reporting type or configurations, or parts based on the determined CSI processing time. $T_1, T_2, \ldots, T_N$ are thresholds.

TABLE 1

| CSI processing time ($\Delta_P$) | Allowed CSI reporting type/ configuration(s)/part(s) | CSI restriction level |
|---|---|---|
| $\Delta_P \leq T_1$ | None | N/A |
| $T_1 < \Delta_P \leq T_2$ | CSI reporting type/configuration #1/part #1 | Level-1 |
| $T_2 < \Delta_P \leq T_3$ | CSI reporting type/configurations #1 and #2/part#1 and #2 | Level-2 |
| ... | ... | ... |
| $T_{N-1} < \Delta_P \leq T_N$ | All CSI reporting type/configurations #1~#N − 1 | Level-N − 1 |
| TN < $\Delta_P$ | All CSI reporting type/configurations | No restriction |

If a CSI processing time is less than a threshold (e.g., $T_1$), at least one of the following WTRU behaviors may be used: a WTRU may drop the triggered CSI reporting or send a discontinuous transmission (DTX); a WTRU may transmit the CSI reporting triggered in a next time instance, wherein the next time instance may be a next uplink channel allocated for the WTRU; a WTRU may report a part (or portion of) a CSI report which may be triggered; a WTRU may measure a subset of resources which may be associated with the one or more triggered CSI reporting settings; or a WTRU may drop one or more of CSI reporting settings which may be triggered in the associated DCI. By dropping the CSI transmission, it may be said that the WTRU is effectively ignoring the triggered CSI reporting or ignoring the scheduling DCI which may be used to trigger aperiodic CSI reporting.

For example, a CSI reporting may comprise one or more of parts like a first part of CSI including at least one of CQI for a first codeword, RI or CRI, and a second part of CSI including at least one of CQI for a second codeword or PMI.

As noted above, if a CSI processing time is less than the threshold (e.g., $T_1$), a WTRU may report only the first part of the CSI and drop the second part of the CSI. Furthermore, the part of CSI (e.g., first or second part) dropped at a time may be reported at a later time of CSI reporting time instance, where the later time of CSI reporting time instance may be predetermined, configured, or implicitly determined based on one or more of scheduling parameters. The unreported portion may be reported in a dedicated signal or may be multiplexed with other signals on one or more uplink channels of the WTRU.

A WTRU may measure a subset of resources which may be associated with the one or more triggered CSI reporting settings. Here, a CSI reporting setting may be associated with one or more resource settings, where a resource setting may contain S resource sets of Ks resources. A WTRU may report CSI based on measurements of a subset of resource settings, resource sets, or resources.

A WTRU may drop one or more of CSI reporting settings which may be triggered in the associated DCI. For example, if Nc CSI reporting settings are triggered, the WTRU may report Ns CSI reporting settings, where Nc>Ns. Thus, one or more of CSI reporting settings triggered may be dropped based on a priority rules. For example, the CSI reporting setting(s) with the lowest priority may be dropped. CSI reporting setting(s) with higher priority levels may be transmitted.

In some instances, CSI transmission may collide with other UL transmissions. In this case, a power level may be exceeded or alternatively, there may not be enough time or bandwidth available to transmit both. Thus, either the CSI may be dropped or one or more of the other UL transmissions may be dropped. In some cases, a WTRU may determine to drop the CSI transmission and transmit an SR or a HARQ transmission. A counter to this example may also be true. In another example, a HARQ-ACK may be multiplexed on PUSCH with the CSI. Of course, CSI may be dropped altogether.

In contrast, if the CSI processing time is longer than a threshold (e.g., $T_N$ in Table 1), all CSI reporting types or configurations may be supported, as shown in Table 1 (lowest row), wherein $T_N$ may be referred to as N-th threshold value configured.

A CSI processing time may determine a CSI reporting type allowed (e.g., requested or triggered) or supported (e.g., determined or reported) for a certain CSI reporting timing. For example, a first CSI reporting type (e.g., a PMI for CSI Type II) may be not allowed or supported for a first CSI processing time range (e.g., CSI restriction level-1; $T1<\Delta_P \leq T2$) while a second CSI reporting type (e.g., a PMI for CSI Type I) may be allowed or supported.

In an example, the following assumption is made: range 1: 0<deltaP<=T1; range 2: T1<deltaP<=T2; range 3: T2< . . . ; and range N: T(n−1)<deltaP<=Tn. Also assuming CSI type 1, type 2, . . . , Type (n−1), then the following may apply. In a first option, if time in Range 1, only CSI type 1 allowed, if time in range 2, CSI T1 and CSI T2 allowed, etc. If time in range N, CSI T1, . . . , CSI Tn is allowed. It should be noted that another option could restrict the type to the range, for example, range 1: T1; range 2:T2 etc.

A CSI restriction level may be determined based on a CSI reporting type or one or more CSI configurations. A CSI restriction level may correspond to or represent a minimum CSI processing time or a CSI processing time range. A higher CSI restriction level may correspond to or may represent a higher CSI processing time (e.g., a higher minimum CSI processing time or a higher range of processing times).

CSI type (e.g., CSI Type I or CSI Type II) may determine the CSI restriction level. For example, a CSI reporting type (e.g., PMI, CQI, RI, or CRI) based on CSI Type II may require or use a higher CSI restriction level than a CSI reporting type based on CSI Type I when the maximum transmission rank (or RI values) are the same.

The maximum rank supported may indicate or be used to determine the CSI restriction level. For example, a CSI reporting type with a higher maximum rank (or a larger number of candidate values) may require or use a higher CSI restriction level than a CSI reporting type with a lower maximum rank (or a smaller number of candidate values).

A codebook restriction level or a number of codewords within a codebook may determine the CSI restriction level. For example, a CSI reporting type with a larger number of codewords in a codebook (e.g., number of candidate precoding vectors/matrices in a codebook which may need to be searched) may require a higher CSI restriction level than a CSI reporting with a smaller number of codewords in a codebook.

CSI reporting type, for example, PMI, CQI, RI, or CRI, may determine the CSI restriction level. For example, a first CSI reporting type, for example, PMI, RI may require or use a higher CSI restriction level than a second CSI reporting type, for example, CQI or CRI. The number of subbands or bandwidth parts used or required may also indicate or be used to determine the CSI restriction level. A combination of reporting type and bandwidth parts may be used as well.

In another embodiment, a number of NR-PDCCH candidates for monitoring of an associated DCI, a number of total NR-PDCCH candidates in a slot or a number of blind decoding attempts for NR-PDCCH monitoring may be restricted or determined based on the candidate y values (or a minimum candidate value of y) or the candidate x values (or a maximum candidate value of x) which may be indicated in the DCI. For example, one or more sets of NR-PDCCH candidates may be used and each set of NR-PDCCH candidates may have a different number of NR-PDCCH candidates (e.g., a different number of blind decoding attempts for NR-PDCCH monitoring) and the determined or configured candidate y values may determine a set of NR-PDCCH candidates.

If the minimum y value is smaller than a threshold, a first number (or set) of NR-PDCCH candidates in a search space may be determined, configured or monitored. If the minimum y value is larger than a threshold, a second number (or set) of NR-PDCCH candidates in a search space may be determined, configured, or monitored. The first number of NR-PDCCH candidates may be smaller than the second number of NR-PDCCH candidates.

If the minimum gap between x and y is smaller than a threshold, a first number (or set) of NR-PDCCH candidates in a search space may be determined, configured, or monitored. Otherwise a second number (or set) of NR-PDCCH candidates in a search space may be determined, configured or monitored by a WTRU.

A minimum, for example, a minimum among the possible combinations of x and y values of a CSI processing time, denoted herein as $\Delta_{P,min}$, may indicate or be used to determine a number of NR-PDCCH candidates or a set of NR-PDCCH candidates. Table 2 shows an example where the minimum CSI processing time determines the number of NR-PDCCH candidates:

TABLE 2

| Minimum CSI processing time ($\Delta_{P,\ min}$) | Number of NR-PDCCH candidates |
|---|---|
| $\Delta_{P,\ min} \leq T_1$ | 4 |
| $T_1 < \Delta_{P,\ min} \leq T_2$ | 8 |
| $T_2 < \Delta_{P,\ min} \leq T_3$ | 16 |
| . . . | . . . |
| $T_{N-1} < \Delta_{P,\ min} \leq T_N$ | 32 |
| $T_N < \Delta_{P,\ min}$ | 44 |

The minimum CSI processing time may be a minimum value among non-negative CSI processing times. The minimum CSI processing time may be determined based on a pair of (x, y) values when x≤y. The minimum CSI processing time may be determined, for example, by a WTRU and/or gNB) based on a set of x values and y values. The set may be a candidate set. The set of x values and y values may be configured via higher layer signaling, for example MAC, RRC, RLC or PDCP signaling.

In another embodiment, the candidate values of x or y may be determined based on the subset of NR-PDCCH candidates, for example, in which a DCI is received. The DCI may be the one that triggers (e.g., indicates) CSI-RS transmission or CSI reporting. For example, a first subset of NR-PDCCH candidates and a DCI received in the first subset of NR-PDCCH candidates may be associated with a first candidate set of values of x or y. A second subset of NR-PDCCH candidates and a DCI received in a second subset of the NR-PDCCH candidates) may be associated with a second candidate set of values of x or y.

The first candidate set of values of x or y may have a lower minimum value of x or y than the second candidate set of values of x or y. For example, the first candidate set may be x={0, 1} and y={0, 1, 2}, while the second candidate set may be x={1, 2} and y={1, 2, 3}. Other sets or set orderings may also be used.

Also, the first candidate set may have a smaller number of candidate values of x or y as compared to the second candidate set. For example, the first candidate set may be x={0} and y={0,1} and the second candidate set may be x={1, 2} and y={1, 2, 3}.

The first subset of NR-PDCCH candidates associated with the first candidate set may be monitored first and the second subset of NR-PDCCH candidates associated with the second candidate set may be monitored next. In another example, the NR-PDCCH search space type may determine the candidate values of x or y. For example, a first candidate set or a second candidate set may be associated with a first search space type, for example, a common search space, group-common NR-PDCCH, group-common CORESET or a second search space type, for example, a WTRU-specific search space, WTRU-specific NR-PDCCH, WTRU-specific CORESET), respectively. If both search spaces are located in a same time window, a WTRU may monitor the first search space type first and monitor the second search space type next.

In yet another example, one or more CSI reporting sets may be configured. A CSI reporting set may comprise at least one of x, y, a CSI reporting type, a CSI reporting configuration or a set of CSI reporting configurations. A CSI reporting set may be indicated in a DCI. A CSI reporting type and its associated CSI reporting configurations may represent a combination of CSI reporting settings, resource settings, and links. The CSI reporting sets may be configured via a higher layer signaling in a WTRU-specific manner. The value of x may not be a part of a CSI reporting set, for example, if an associated CSI-RS for measurement is a periodic CSI-RS or a semi-persistent CSI-RS.

A set or a super set of CSI reporting sets may be configured, for example, via WTRU-specific RRC signaling. A subset of CSI reporting sets may be activated or deactivated via a MAC-CE or any other MAC layer element. Other layers may also be used. A DCI may indicate a CSI reporting set which may be one of the activated subsets of CSI reporting sets.

Table 3 shows an example of CSI reporting set types. A set may be indicated by a number and correspond to an x, y. The set type may indicate different CSI reporting types and CSI configurations.

TABLE 3

| set | x | y | CSI reporting type(s) | CSI configuration(s) |
|---|---|---|---|---|
| 0 | 0 | 0 | CQI | wideband |
| 1 | 0 | 0 | CRI | 4 CSI-RS resources |
| 2 | 0 | 1 | CQI | subbands |
| ... | ... | ... | ...... | ... |
| Ns-5 | 1 | 0 | SSBRI/RSRP | symbols containing reference signals |
| Ns-4 | 1 | 1 | CRI/RI/PMI/CQI | wideband + subbands (no codebook subset restriction) |
| Ns-3 | 2 | 2 | CRI/RI/LI/PMI/CQI | wideband + subbands (no codebook subset restriction) |
| Ns-2 | 2 | 3 | CQI, PMI, RI | wideband + subbands (codebook subset restriction configuration k) |
| Ns-1 | 2 | 4 | CQI, PMI, RI | wideband + subbands (no codebook subset restriction) |

WTRUs may have varying capabilities, for example WTRUs may support different bands, support internet protocol communications, support differing measurement configurations, etc. WTRUs may be of differing types, for example, high cost, low cost, machine type communication (MTC) compliant, etc. WTRUs may report a capability of CSI reporting and timing as well as other traditional capability reporting. A WTRU may perform an explicit or implicit signaling of WTRU capability for CSI reporting timing and thus a TRP may receive the signaling and registration information. The TRP may indicate this information to another network node.

For an aperiodic CSI reporting, a WTRU may receive an aperiodic CSI reporting trigger indication with a reporting timing parameter, for example, parameter y of FIG. 3, which may indicate the slot at which the WTRU may need to transmit the triggered aperiodic CSI reporting. The CSI may be readied, i.e., the CSI measurement for the CSI reporting may be finished, some time before the CSI reporting timing, for example, #m+y of FIG. 3. An amount of time a WTRU uses to determine, measure or prepare CSI for reporting, may depend on the implementation capabilities and details of the WTRU. A gNB may use this information to determine valid values of y to be used by the WTRU. In one embodiment, a WTRU may also transmit an RI with CSI feedback. In this way, a transmission may include CRI/RI/PMI/CQI or CRI/RI/LI/PMI/CQI. Or any other alternative combination for that matter.

In one embodiment, a WTRU may indicate, report, or signal CSI processing information, for example, a processing capability, to a gNB. The CSI processing information may comprise a supportable minimum y value or a supportable minimum processing time value for one or more CSI reporting combinations. The supportable minimum processing time value may, for example, be a minimum value of y-x or y (when x=0) that the WTRU may support. The minimum value may account for a TA, such as an actual TA, a reference TA, a maximum TA, or a configured TA.

A CSI reporting combination may include at least one of: a number or maximum number of CSI reporting settings; a number or maximum number of links where a link may be between at least one CSI reporting setting and at least one resource setting which may determine the measurement resource, for example, a CSI-RS resource or resource setting for a CSI reporting setting; a number or maximum number of resource settings; one or more CSI reporting types; a CSI reporting bandwidth; a numerology, for example, an absolute time for a CSI measurement; a number of antenna ports; or a number of beams. Latency may also be considered alone or in combination with one of these settings. For example, latency may be considered in combination with numerology to determine whether or not a reporting method may be available or allowable.

In an example, a WTRU may report or indicate a set of CSI reporting combinations for each y or CSI processing value. In another example, a WTRU may report y (e.g., minimum-supported y or minimum value of y supported) or CSI processing time (e.g., minimum-supported CSI processing time or minimum value of CSI processing time supported) value for one or more CSI reporting combinations. The CSI reporting combinations for the reported y or CSI processing time value may be signaled or configured, for example, by higher layer signaling such as RRC signaling or broadcast signaling. Tables 4 and 5 show examples of signaling to indicate the CSI processing information.

TABLE 4

| 2 bits | n1 bits | n2 bits | n3 bits | n4 bits |
|---|---|---|---|---|
| y | CSI-reporting type | CSI-reporting BW | Number of antenna ports | Number or maximum number of beams |

TABLE 5

| Index | Signaling | |
|---|---|---|
| 0 | CSI-reporting type | (x-bits) |
| 1 | CSI-reporting BW | (x-bits) |

TABLE 5-continued

| Index | Signaling | |
|---|---|---|
| 2 | Number of antenna ports | (x-bits) |
| 3 | Number of beams | (x-bits) |

In an example, the capability information may be implicitly derived or determined. The minimum y or processing time values for different CSI reporting combinations may be determined based on at least one of WTRU category, number of WTRU receive antennas, maximum supportable frequency bandwidth of the WTRU, or maximum supportable subcarrier spacing of the WTRU.

For example, a higher WTRU category may have a better computational power and may support a lower minimum y or processing time value. In another example, a WTRU with a larger number of receive antennas may provide a CSI reporting with a higher rank. A higher rank may require additional CSI processing time to compute due to the complexity. Because of this complexity, a larger minimum y or minimum processing time value may be used, configured, or determined for a WTRU with a larger number of receive antennas. In another example, a WTRU with a wider supportable frequency bandwidth may have a better computational power. A smaller minimum y or processing time value may be used, configured, or determined for a WTRU with a wider supportable frequency bandwidth. The maximum supportable frequency bandwidth may be determined based on the maximum number of component carriers supported at the same time. Some exemplary WTRU types include: LC-MTC, eMTC, Cat0, PSM, eMTC, Cat M1, CE, NB-IoT, Cat NB or the like.

Figure 5:
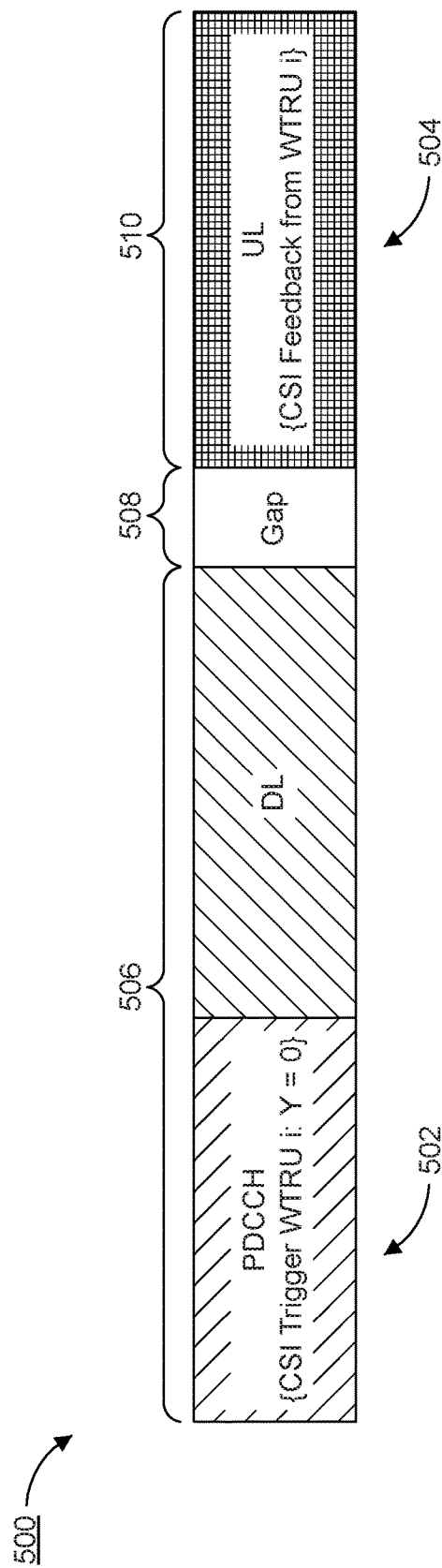
FIG. 5 illustrates an example self-contained slot with CSI feedback according to an embodiment.

FIG. 5 illustrates an example of a self-contained slot 500 with CSI feedback according to an embodiment. When a WTRU receives an aperiodic CSI reporting trigger 502 and transmits the triggered CSI reporting 504 in the same slot, the slot may be referred to as a self-contained slot (or self-contained slot structure). A WTRU may perform a self-contained CSI reporting by reporting the CSI 504 within a same slot that the CSI reporting triggering indication is received 502. In particular, when y=0, a WTRU may report the CSI within the same slot. The slot 500 may comprise a DL part 506, gap 508 and UL part 510. The DL part 506 may comprise the CSI trigger 502 as well as other DL information.

When a WTRU reports a CSI in a self-contained slot, the WTRU may report the CSI, based on a CSI-RS that the WTRU received in a previous slot. When a WTRU reports a CSI, based on a trigger indicating y or a processing time below a threshold, the WTRU may report a CSI, based on a CSI-RS that the WTRU received in a previous slot or based on a CSI-RS the WTRU received prior to the trigger.

In an example, when the CSI trigger indicates y=0 or a CSI processing time ($\Delta_P$) is less than a threshold, the WTRU may report a CSI already measured or available (or may be based on a CSI-RS available) before the aperiodic CSI reporting is triggered, or before a CSI-RS transmission occurring after the trigger, but before the CSI reporting.

One or more thresholds may be configured. For example, a WTRU may determine one or more thresholds based on WTRU capability like processing capability. The CSI reporting combination to be reported may determine the thresholds. When a WTRU is triggered to report CSI and its associated CSI processing time is less than a threshold (e.g., $\Delta_P$<threshold), the WTRU may report one or more CSIs that may be measured or determined within the CSI processing time, wherein the one or more CSIs may be a subset of triggered CSIs.

The bit fields for the CSIs that may not be reported may be set to values to be known, for example, zero bits or other predefined bits or bit patterns. They may also be previously reported values. Or, the values may be removed and a WTRU may indicate which CSIs are missing or not reported. For example, a bitmap may indicate which CSIs are reported and which CSIs are not reported. A WTRU may determine a physical uplink channel, for example, a physical uplink control channel (PUCCH) or physical uplink shared channel (PUSCH)) on which to transmit a CSI based on the number of available CSIs for the reporting or the number of bits required for the reporting of the available CSIs. If the available CSIs are less than a threshold, the WTRU may use a PUCCH. Otherwise, PUSCH may be used for the CSI reporting.

Also, a WTRU may determine the number of physical resource blocks (PRBs) for a PUSCH, based on the number of available CSIs for the reporting or the number of bits required for the reporting of the available CSIs when the PUSCH transmission only contains uplink control information (UCI). A smaller number of PRBs (or a subset of scheduled PRBs) may be used or determined if the available CSIs are less than a threshold; otherwise, all scheduled PRBs for a PUSCH may be used.

Figure 6:
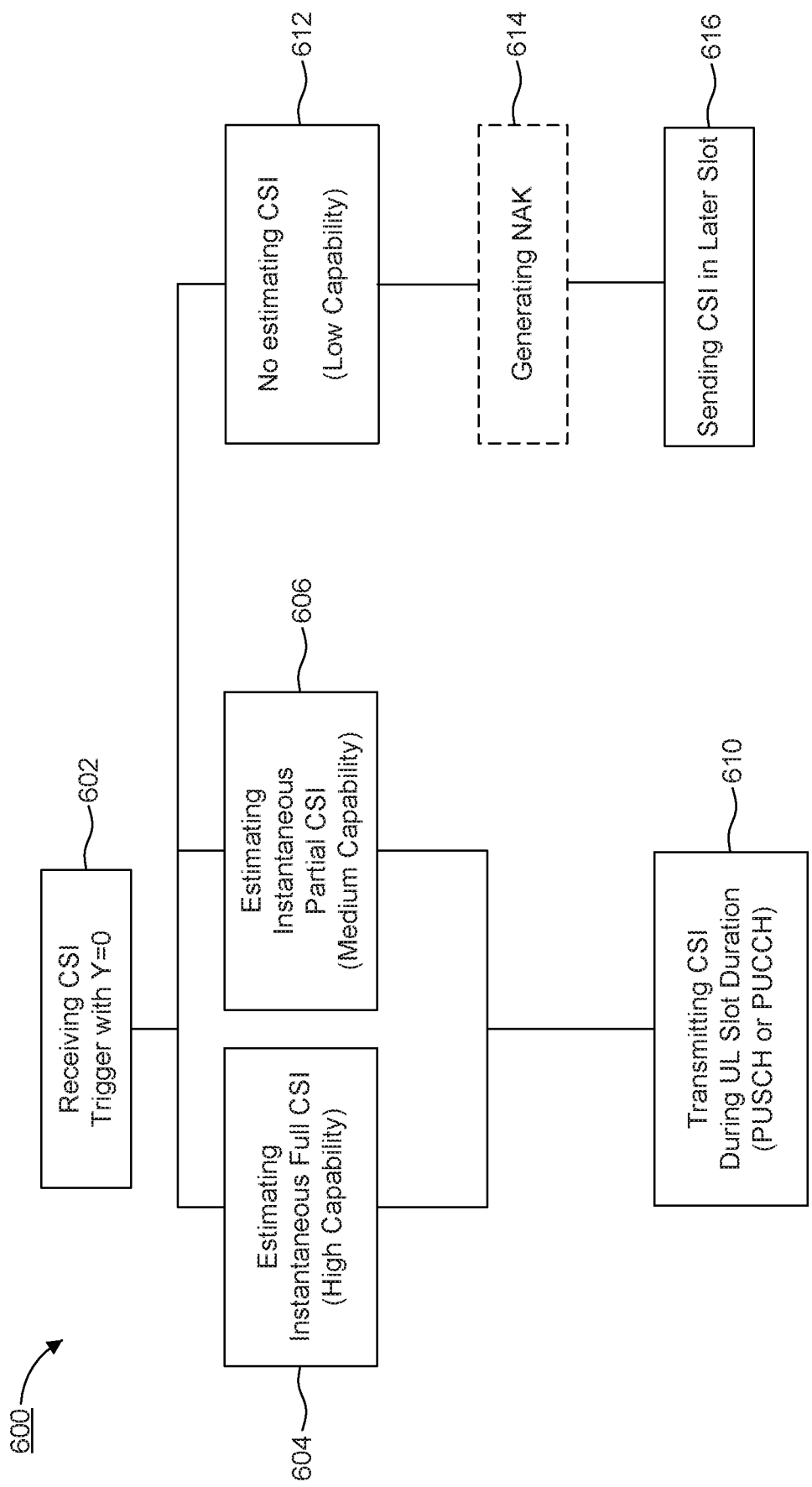
FIG. 6 illustrates a flow diagram of a wireless transmit/receive unit (WTRU) procedure for self-contained CSI reporting according to an embodiment.

FIG. 6 shows a procedure 600 for operation by a WTRU. The procedure 600 illustrates CSI trigger reception, WTRU processing and a CSI transmission for self-contained CSI reporting. When the CSI trigger indicates y=0 or that a CSI processing time is less than a threshold 602, a WTRU may report CSI, based on its capability. If a WTRU has high capability or ample processing power 604, the WTRU may estimate or measure a full CSI report 604 and transmit 610 the full CSI report to the gNB within the current slot. If a WTRU has medium capability 606, a subset of the CSI report may be estimated and transmitted 610 to the gNB within the current slot. If a WTRU has low capability 612, the WTRU may not support or may indicate no support for self-contained CSI reporting, no support of y=0, or no support of processing time less than one slot. Optionally, the WTRU may generate no acknowledgment (NAK) 614. The WTRU may send the requested CSI in a later slot 616.

A WTRU may send an indication of a capability of supporting self-contained CSI reporting to a TRP such as a gNB or other base station, for example, during WTRU initialization, setup and/or registration. Alternatively, a WTRU category may be tied to a self-contained CSI reporting capability and the WTRU category may implicitly determine its self-contained CSI reporting capability. Alternatively, the WTRU may autonomously determine the self-contained CSI report that it feeds back to the gNB, for example, based on its current load or others. To limit the feedback overhead, a WTRU may only report CSI that has changed from the last CSI report sent to the gNB. A CSI reporting timing may be configured via higher layer signaling or indicated via a common DCI. With respect to configuring a CSI reporting timing via higher layer signaling, one or more y values for a WTRU, a TRP, or a CSI reporting setting may be configured via higher layer signaling, for example MAC, RLC, RRC or PDCP signaling. When a WTRU receives a trigger from a TRP for CSI reporting, the WTRU may determine the y value based on the higher layer configuration. Also, one or more y values may be semi-statically configured by the network. The WTRU may be assigned with an initial or default y value and an update of the y value may be done through higher layer signaling such as RRC signaling. The WTRU may determine the y value based on a CSI reporting setting.

In an example, a WTRU may be configured with a set of (candidate) y values, for example, through RRC configuration or other higher layer signaling, for example MAC, RLC, RRC or PDCP signaling. The y value may be linked to, correspond to or be associated with one or more CSI reporting settings, e.g., depending on the reporting requirements. For example, a set of y values may comprise y={a1, a2} and CSI reporting settings 1 and 2 may use y=a1 while CSI reporting setting 3 uses y=a2. When the WTRU receives a DCI with an aperiodic CSI request for a CSI reporting setting, the WTRU may use the y value corresponding to the CSI reporting setting.

A y value may be configured for one or more CSI reporting settings. The y value may be a part (component or indicator of) of a CSI reporting setting or a parameter of a CSI reporting setting. In addition, an x value may be configured for one or more resource settings. An x value may be a part of a resource setting or may be a parameter indicative of a resource setting. In another example, a first higher layer signaling, for example via RRC signaling, may configure a set of y values and a second higher layer signaling, for example, MAC-CE signaling, may activate or deactivate a subset of the set of y values. A WTRU may be indicated with a y value within the subset of y values. Furthermore, the number of y values in the subset may determine the number of bits (or code points) in an associated DCI.

With respect to indicating a CSI reporting timing via a common DCI, the common DCI may be transmitted by a gNB or a TRP and monitored by a WTRU, for example, in every slot or in a subset of slots. The common DCI may provide a slot frame information for the associated slots. A TRP may update a y value for at least some of its connected or attached WTRUs at once. The TRP may request, via the common DCI, an aperiodic CSI report with a temporary y that may override a configured y value. A common DCI may provide values for a plurality, for example, a group of WTRUs, or may indicate values based on type or based on individual WTRU ID.

For example, the y value may be included in a cell common DCI, a TRP common DCI, or a group common DCI. A TRP may send, on the cell common search space, a DCI to request aperiodic CSI reporting. The DCI may include a y value that may be used by one or more WTRUs monitoring the common search space. The TRP may include an indication (e.g., an indication bit) to specify whether the y value is being reconfigured (e.g., for all future requests) or whether it is for the requested measurement or report (e.g., for a single instance).

Figure 7:
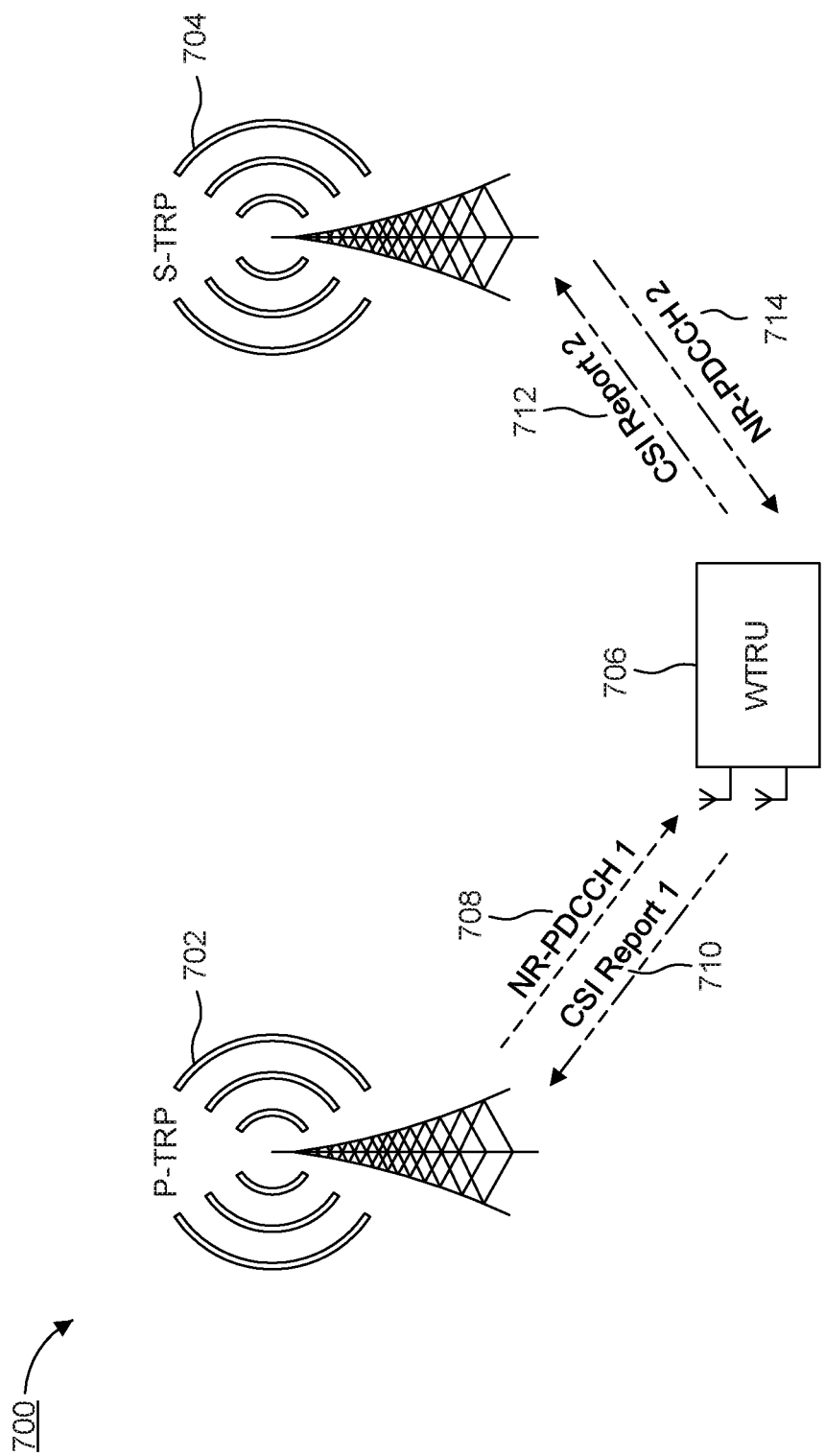
FIG. 7 illustrates a schematic view of an exemplary multiple aperiodic CSI report triggering procedure initiated from a single DCI according to an embodiment.

FIG. 7 is a diagram 700 which illustrates a WTRU 706, a primary TRP 702 and a secondary TRP 704. FIG. 7 illustrates that a single DCI may trigger multiple CSI reporting transmissions with multiple y values for multiple TRP operation. For example, a WTRU 706 may be connected to multiple TRPs, 702, 704 simultaneously to increase transmission rates or diversity gain. The WTRU may be served by multiple TRPs 702, 704 where one TRP may act as a primary TRP (P-TRP) 702 for a primary cell and the other TRPs may act as secondary TRPs (S-TRPs) 704 for a secondary cell. Both the P-TRP and S-TRPs may transmit their own NR physical downlink shared channels (NR-PDSCH) 708, 714 that may comprise same or different transport blocks. The WTRU transmits CSI Report 1 701 to the P-TRP 702 and CSI Report 2 712 to the S-TRP 704.

In a multi-TRP deployment, a NR-PDCCH from the P-TRP may schedule multiple NR-PDSCHs originating simultaneously from multiple TRPs towards one WTRU. The resource assignments may be transmitted through DCIs on the P-TRP. The number of TRPs associated with the WTRU may determine the number of DCIs or a single DCI may be used to schedule one or more NR-PDSCHs from multiple TRPs. In some embodiments, CSI may be calculated simultaneously. Each one of the plurality of simultaneous calculations may be related to transmissions to/from a unique TRP. These CSI calculations may be performed by a CSI calculating unit (CSI-CU). One or more triggers may be received from a single TRP or multiple triggers may be received from multiple TRPs. In some instances, a single CSI-SU may be operating to determine CSI measurements for a periodic transmission, while another CSI-SU may be operating to determine CSI measurements for an aperiodic transmission. Multi-TRP deployments may be dual connectivity type deployments. Carriers of the TRPs may be aggregated among a WTRU.

Thus, a WTRU may be configured with a number of DCIs potentially used for NR-PDSCH reception from one or more TRPs, wherein the number of DCIs may be configured from the P-TRP. If a single DCI is used for multi-TRP operation, the WTRU may monitor the DCI in a NR-PDCCH search space in the P-TRP. If multiple DCIs are used for multi-TRP operation, the WTRU may monitor the multiple DCIs in a NR-PDCCH search space in the P-TRP or each DCI may be monitored in its associated NR-PDCCH search space. The associated NR-PDCCH search space may be located in the P-TRP or its associated TRP. When multiple DCIs are used, a DCI for a TRP may be identified based on the Radio Network Temporary Identifier (RNTI). For example, each DCI may have its own RNTI (e.g., RNTI may be TRP-specific).

In an example, a DCI format may include a multi-TRP aperiodic CSI request field for example, 1 bit or other bit field. Upon receiving the DCI or in response to receiving the DCI with the multi-TRP aperiodic CSI request field, the WTRU may be triggered to report CSI for the P-TRP or at least some or all TRPs using a y value that may be configured. The y value used may have been previously set via a higher layer signaling (e.g., through RRC reconfiguration messages) when the WTRU first associated to multiple TRPs. A CSI request field may be on a DCI and trigger the CSI report on PUSCH or another channel.

In another example, a multi-TRP aperiodic CSI request field may include multiple bits in a DCI format, which triggers aperiodic CSI reporting for one or more TRPs. For example, the multi-TRP aperiodic CSI request field, based on a bitmap, may indicate which TRP CSI reporting is triggered. As shown in Table 6, a CSI trigger field may indicate which set of TRPs are triggered for the aperiodic CSI reporting (ON: triggered, OFF: not triggered). The actual implementation may be vice versa or may be coded or indicated in another way.

TABLE 6

| CSI trigger field | P-TRP | S-TRP-1 | S-TRP-2 | S-TRP-3 |
|---|---|---|---|---|
| 000 | OFF | OFF | OFF | OFF |
| 001 | ON | OFF | OFF | OFF |
| 010 | ON | ON | OFF | OFF |
| ... | ... | ... | ... | ... |
| 110 | OFF | ON | ON | ON |
| 111 | ON | ON | ON | ON |

The P-TRP may also dynamically set the x or y values for itself or one or more S-TRPs through its aperiodic CSI reporting trigger. In another example, one or more x or y values may be dynamically updated through the DCI by including one or more x or y values in addition to the multi-TRP aperiodic CSI request field. The WTRU may use the updated x or y values for one or more TRPs which it is connected to or associated with.

Resource assignments may be performed independently at each TRP. For example, a NR-PDSCH transmitted from a P-TRP may be scheduled on one set of RBs, while an S-TRP may choose to transmit on another set of RBs. The traffic types may be different on each link. For example, one link may transmit enhanced Mobile Broadband (eMBB) data, while the other link may transmit ultra-reliable low latency communications (URLLC). The feedback requirements may be different in the P-TRP and the S-TRP links, for example, in terms of granularity of feedback, latency requirements, reporting frequency, feedback type or other parameters. The same y value may not be suitable for all the links. CSI latency may depend on subcarrier spacing.

In another example, the x or y values may be updated for a subset of TRPs, for example, by including additional bits in the DCI to indicate which TRPs should use the new x or y value. With N TRPs serving a WTRU, N bits may be used to indicate a bitmap for any combination of TRPs required to use the updated x or y values. The n-th bit may represent whether the updated value applies to the TRP n where n=1:N. For example, the DCI may include the fields <multi-TRP aperiodic CSI request: 1, y*, multi-TRP bitmap: 01>, which may trigger an aperiodic CSI report at the S-TRP using y* for a WTRU connected to two TRPs.

A WTRU may further be configured to perform multi-level CSI reporting. In particular, a WTRU may be configured to send an aperiodic CSI report with a timing offset of y from a CSI trigger event. The value of y may correspond to a WTRU-specific configuration. The value of y may be indicated dynamically or semi-statically to a WTRU or a group of WTRUs. A set of values for y may be defined or configured (e.g., semi-statically). A WTRU may select an intended value from the set, based on an index provided or indicated in a received or associated DCI. The WTRU may be configured to report CSI based on a level corresponding to a particular type of CSI feedback.

In an example, a WTRU may suggest a y value, for example, to a gNB. Alternatively or in combination, the WTRU may at least indicate whether the value y should be increased or decreased. For instance, one bit (e.g. two indicated states) may be used for such an indication. For example, if a WTRU may not measure a triggered CSI for the indicated, configured, or determined value y, the WTRU may send all zero bits in the allocated uplink resource which may be considered as a request of increasing y value. In contrast, if a WTRU may be able to measure the triggered CSI at least one slot earlier than the indicated y value, the WTRU may send an indication that the y value may be decreased. The indication of decreasing a y value may be based on a scrambling sequence of the cyclic redundancy check (CRC) attached for the aperiodic CSI. The indication of decreasing a y value may be a single bit attached in the aperiodic CSI (e.g., 0: no change of y value, 1: may decrease 1 slot).

In an example, a WTRU may send the CSI report in an incremental manner. A WTRU may determine to use a multi-level CSI reporting of the CSI based on different conditions. For example, for when an updated CSI report is not available, a WTRU may report a stale CSI with follow up, for example, immediate or delayed follow up updates. In some examples, a WTRU may not have available resources, for example, PUSCH or PUCCH resources to accommodate a CSI report that includes both regular traffic and a CSI report. The WTRU may spread the CSI report content over multiple transmissions.

FIG. 8 illustrates an example 800 of an aperiodic multi-level CSI reporting process for a system with a DL-UL mixed slot structure. A multi-level CSI reporting process may comprise M levels of reporting, each distanced by an offset of A slot from the previous report, when $\Delta \geq 1$. The offset parameter $\Delta$ may be a WTRU-specific configured parameter. FIG. 8 shows an example process for M=3 (three levels) and an offset=1. Additionally, the last (M−1) levels of CSI reporting may be overridden by traffic of a higher priority. Different combinations of first (level) and subsequent (M−1 level) report types are described below.

In FIG. 8, aperiodic CSI may be triggered may be transmitted in a DL part 802 of a slot. In the UL part 804 of the same slot, a first level CSI may be transmitted. A DL part 806 of a next slot may follow in which no trigger is received. Nonetheless, the WTRU may report a second level CSI in the following UL part 808 of the same slot. In the DL part 810 of the next slot, again no trigger need be received. Following the DL part 810, a third level CSI may be transmitted in an UL part 812 of the slot.

According to an example, the first CSI report may or may only contain the wideband CQI, or the wideband CQI and a subset of the sub-band PMIs. The remaining or following (e.g., M−1) reports may contain the remaining subsets of subband PMIs.

According to another example, a first CSI report may be a subband CQI (higher layer configured) and wideband PMI report. Thus, the first report may contain the wideband PMI, or the wideband PMI and a subset of the sub-band CQIs. The remaining or following (e.g., M−1) reports may contain the remaining subsets of subband CQIs.

According to another example, the first CSI report may be a subband CQI (WTRU-selected) and wideband PMI report. Thus, the first report may contain the average CQI; or the wideband CQI; or the average CQI and wideband PMI; or the average CQI and wideband PMI and a subset of the sub-band CQIs. The remaining or following (e.g., M−1) reports may contain the remaining subsets of subband CQIs.

According to another example, the first CSI report may be a subband CQI (higher layer configured) and subband PMI report. Thus, the first report may contain a subset of the sub-band CQIs, or a subset of the sub-band PMIs, or a combination thereof. The remaining or following (e.g., M−1) reports may contain the remaining subsets of subband CQIs and PMIs.

Finally, the first CSI report may be a subband CQI (WTRU-selected) and subband PMI report. Thus, the first report may contain the average CQI; or the average CQI and a subset of the sub-band CQIs. The remaining or following (e.g., M−1) reports, may contain the remaining subsets of subband PMIs.

In addition, if there are sufficient amounts of PUSCH resources available, and the y value is small such that the CSI report may be forced to use a stale CSI, a multi-level CSI mechanism may be used, for example, to improve the accuracy of the CSI report. A WTRU may use a first level CSI report to send the available (stale) CSI report. The WTRU may use the remaining or following (e.g., M−1) CSI level(s) to update the CSI.

Furthermore, the offset parameter $\Delta$ may be configured such that the second CSI reporting opportunity occurs after a CSI measurement opportunity, for example, to allow an accurate update. The update may be as a complete replacement of the previous report or in form of a differential reporting or a combination thereof FIG. 9 illustrates another example 900 of an aperiodic multi-level CSI reporting process according to an embodiment. In particular, FIG. 9 shows a M=2 level aperiodic CSI mechanism where the aperiodic CSI is triggered at ith slot. Since y=0, a WTRU reports the available CSI information, in the same slot, that is based on the measurement performed at K slots earlier. Since a gNB is aware of the timing of the next CSI measurement opportunity at slot (i+2)nd, the WTRU is configured with Δ=2. At slot (i+2)nd, WTRU updates the CSI based on the most recent measurement. In the example shown in FIG. 9 a CSI measurement 902 was performed in the (i-k)th DL slot. This CSI measurement is the last CSI measurement made at the time the ith slot 904 is being processed. The WTRU receives a trigger for aperiodic CSI in the ith slot and subsequently reports CSI 906 in the following UL part of the same slot. This same slot reporting is due to the fact that y=0. During the following slot (i+1), no CSI transmission is made. However, in the UL section of slot (i+2), a new CSI measurement is taken 908 and a CSI transmission 910 is made. CSI transmission 910 comprises a report based on CSI measurement 902. The setting of Δ=2 in this case is what allowed slot (i+1) to be used for TX/RX unrelated to CSI. Choosing a higher Δ value will result in a less frequent CSI transmission.

In another example, one or more CSI reporting sets may be configured and a WTRU may be indicated with a CSI reporting set when an aperiodic CSI reporting is triggered. A CSI reporting may include one or more CSI reporting instances. A CSI reporting instance (or each CSI reporting instance) may be associated with a separate (e.g., different) y value.

Table 7 shows examples of CSI reporting sets with multiple CSI reporting instances. In this example, Ns is the number of configured CSI reporting sets and Ks may represent the number of CSI resources configured.

a preferred or a selected CSI-RS resource among multiple CSI-RS resources, and associated CSIs (e.g., CQI, PMI and/or RI), a WTRU may report the CRI at the first CSI reporting instance (e.g., y=0). The WTRU may report wideband {CQI, PMI, or RI} for the selected CSI-RS resource which may be indicated from the CRI at the second CSI reporting instance (e.g., y=1). The WTRU may report subband CQI and/or PMI for the selected CSI-RS resource which may be indicated from the CRI at the third CSI reporting instance, for example, y=2).

The same uplink resources may be used for all CSI reporting instances within a CSI reporting set. Alternatively, slot index or time location of the CSI reporting instance may determine an uplink resource for a CSI reporting instance.

Figure 10:
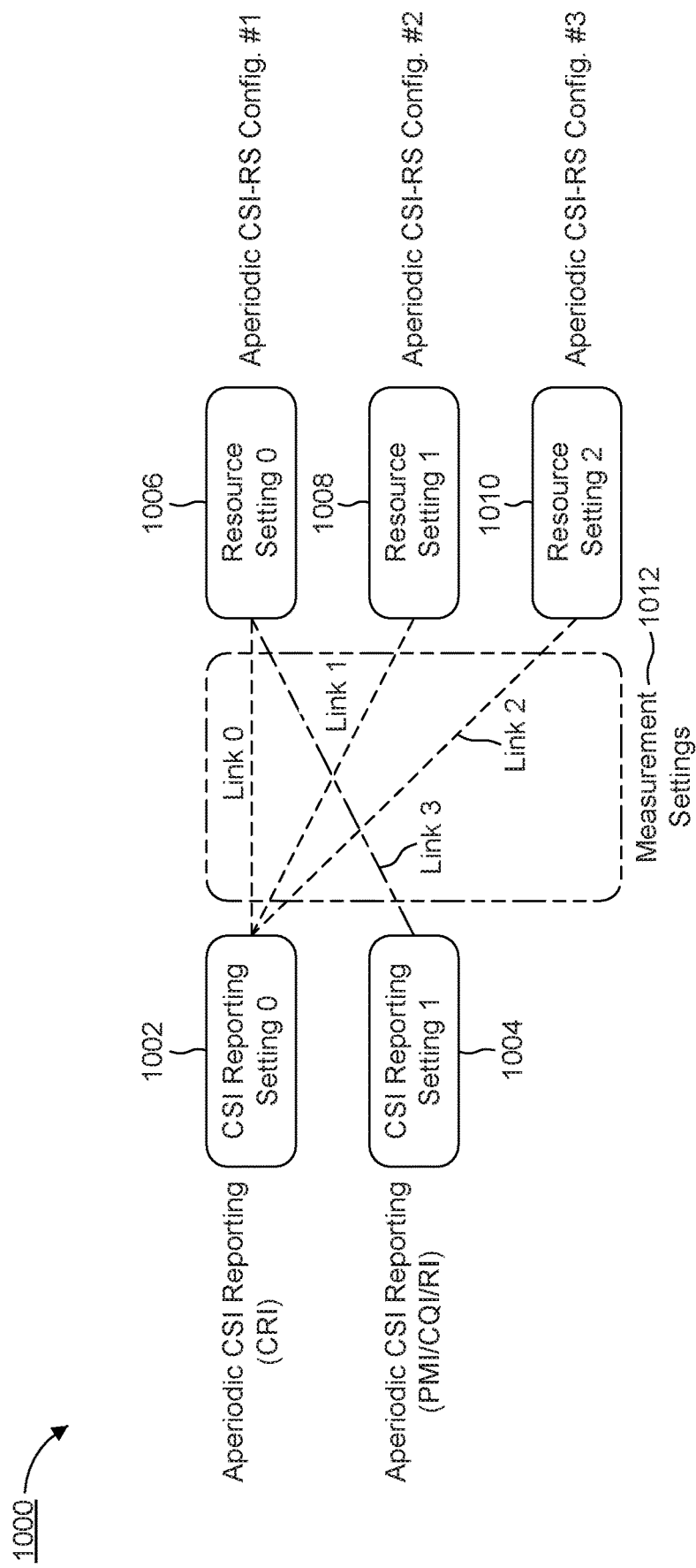
FIG. 10 shows another block diagram of an example configuration for CSI reporting settings, resource settings and links.

CSI reporting subset determination may be provided where there are limited UL resources available and may include a procedure used to select a subset of CSI reporting settings for aperiodic CSI reporting when an allocated resource is not enough. The procedure may further include evaluating or monitoring conditions to trigger subset section including target coding rate, available REs, or scheduled parameters for PUSCH. The subset selection methods may include priority rules, measured CQI of subbands, or parameters of the CS reporting settings More particularly, a WTRU may be configured with CSI reporting settings, resource settings, and links between the CSI reporting settings and the resource settings. FIG. 10 shows another block diagram of an example configuration for CSI reporting settings, resource settings and links. For example, CSI Reporting Setting 0 1002 and CSI Reporting Setting 1 1004 may be configured with Aperiodic CSI Reporting (CRI) and Aperiodic CSI Reporting (PMI/CQI/RI), respectively. Also, Resource Setting 0 1006, Resource Setting 1 1008, and Resource Setting 2 1010 may be configured with Aperiodic CSI-RS Configuration #1, Aperiodic CSI-RS Configuration #2, and Aperiodic CSI-RS Configuration #3, respectively. The CSI Reporting Setting 0 1002 is linked with the Resource Setting 0 1006, the Resource Setting 1 1008, and the Resource Setting 2 1010,

TABLE 7

| set | x | y | CSI reporting type(s) | CSI configuration(s) |
|---|---|---|---|---|
| 0 | 0 | 0 | CRI | For Ks CSI-RS resources |
|   |   | 1 | Wideband {CQI, PMI, or RI} | For the selected CSI-RS resource from the CRI |
|   |   | 2 | Subbands {CQI, PMI} | For the selected CSI-RS resource from the CRI |
| 1 | 0 | 1 | CRI and wideband {CQI, PMI, or RI} for the selected CSI-RS resource | For Ks CSI-RS resources |
|   |   | 2 | subbands {CQI, PMI} for the selected CSI-RS resource |   |
| ... | ... | ... | ... | ... |
| Ns-1 | 2 | 3 | CRI and wideband {CQI, PMI, or RI} for the selected CSI-RS resource | For Ks CSI-RS resources |
|   |   | 4 | subbands {CQI, PMI, or RI} for the selected CSI-RS resource |   |

In a CSI reporting set, one or more y values may be used and each y value may be associated with one or more CSI reporting types or one or more CSI configurations. A WTRU may report the associated CSI reporting types and CSI configurations in the time location indicated by the y value. The number of y values for a CSI reporting set may be different, according to the CSI reporting set index.

In an example, if multiple CSI-RS resources are configured and a WTRU is indicated to report a CRI, for example, via Link 0, Link 1, and Link 2, respectively. The CSI Reporting Setting 1 1004 is linked with the Resource Setting 0 1006 via Link 3.

As shown in FIG. 10, one or more CSI reporting settings 1002, 1004 may be configured with aperiodic CSI reportings, which may be linked with one or more resource settings 1006, 1008, 1010. The one or more resource settings may be at least one of aperiodic CSI-RS, periodic CSI-RS, semi-persistent CSI-RS, synchronization signal and PBCH block (SS/PBCH block). A DCI for aperiodic CSI reporting triggering may indicate one or more CSI reporting settings, where each CSI reporting setting may include an uplink resource for the CSI reporting. For example, one or more uplink resources may be configured as a candidate uplink resource for CSI reporting. A linking may be configured in memory of a TRP or WTRU using a database, bitmap or the like.

For example, one or more short-PUCCH (sPUCCH) resources may be configured and the one or more short-PUCCH resources may be located at n+y slot. The one or more sPUCCH resources may be associated with different CSI reporting types. For example, if a WTRU is configured or indicated to report wideband PMI, CQI, and RI, a first sPUCCH resource may be used for the wideband PMI reporting, a second sPUCCH resource may be used for the wideband CQI, and a third sPUCCH resource may be used for the RI.

One or more sPUCCH resources may be selected, indicated, or determined based on an explicit signaling in the associated DCI. For example, a sPUCCH resource index within the configured sPUCCH resource for the CSI reporting setting may be indicated. Or, one or more sPUCCH resources may be selected, indicated or determined implicitly based on the scheduling parameters or CSI reporting triggering parameters in the associated DCI. One or more of sPUCCH, long-PUCCH (longPUCCH), or PUSCH resources may be used for aperiodic CSI reporting, where sPUCCH or long-PUCCH resources may be configured via a higher layer signaling while PUSCH resources may be indicated, determined, or scheduled in the associated DCI.

For example, a bit flag (R_flag) in the associated DCI for aperiodic CSI reporting triggering may be used to indicate which type of uplink resources may be used for the corresponding CSI reporting. For example, if R_flag is set to "0" (e.g., "R_flag=False"), the bit fields for the PUSCH resource scheduling (e.g., PRBs, MCS level, etc.) may be used to indicate the uplink resource based on one or more sPUCCH or long-PUCCH. On the other hand, if R_flag is set to "1" (e.g., "R_flag=True") the bit fields for the PUSCH resource scheduling are used for PUSCH resource scheduling in which the triggered CSI may be reported. Alternatively, RNTI of the DCI may be used instead of the bit flag (R_flag) to determine whether the bit fields for the PUSCH resource scheduling are used for PUSCH resource scheduling or PUCCH resource scheduling.

The candidate uplink resource types may be restricted or determined based on the CSI reporting setting configuration. For example, if a CSI reporting setting includes CSI reporting types like subband PMI reporting based on Type II codebook, the candidate uplink resource types may be PUSCH resource type only. If a CSI reporting setting includes CSI reporting types like wideband PMI, CQI, RI, and CRI, the candidate uplink resource types may be sPUCCH, long-PUCCH, and PUSCH. Furthermore, the candidate uplink resource types may also be determined based on the number of resource sets or the number of resources within a resource set. A resource setting may be configured with S≥1 resource sets and each resource set may be configured with Ks≥1 resources.

A DCI for aperiodic CSI reporting triggering may indicate one or more of the links between CSI reporting settings and resource settings. For example, a WTRU may receive an indication to report Link 0 or Link 3 shown in FIG. 10, where Link 0 is linking the CSI Reporting Setting 0 1002 and the Resource Setting 0 1006, Link 3 is linking the CSI reporting setting 1 1004 and the Resource Setting 0 1006.

A resource setting may be configured with S≥1 resource set, where each resource set may be configured with Ks resources. Therefore, a WTRU may report CRI based on the measurement of Ks CSI-RS resources if one of the resource set is selected or a WTRU may report CRI based on the measurement of up to S×Ks CSI-RS resources.

In an example, a WTRU may determine a subset of CSI reporting settings triggered in the associated DCI when one or more predetermined, configured, or indicated conditions are met. When a WTRU is triggered to report one or more CSI reporting settings, the WTRU may determine to report the triggered one or more CSI reporting settings based on the one or more conditions.

The trigger conditions that cause a WTRU to determine a subset of CSI reporting settings may include at least one of following: a number of REs scheduled for PUSCH; a coding rate (or effective coding rate) of the PUSCH transmission or UCI transmission; a number of parts for a CSI reporting; a number of PRBs scheduled; or a number of layers for PUSCH transmission.

A trigger condition may be based on a number of resource elements (REs) scheduled for PUSCH, where the scheduled PUSCH may be used to report one or more triggered CSI reporting settings. For example, if the number of REs for the scheduled PUSCH is less than a threshold, a WTRU may determine to report a subset of triggered CSI reporting settings. Furthermore, the number of REs may be available REs for PUSCH transmission which may not include at least one of reference signal (e.g., DM-RS, PTRS, SRS), downlink resources (for example, a DL part of a slot), gap (for example, a gap between UL and DL); or the number of REs that may be the total number of REs within the scheduled resources.

A trigger condition may be based on a coding rate or effective coding rate of a PUSCH transmission or UCI transmission, where the coding rate may be determined based on a ratio between the coded bits of the one or more CSI reporting settings and the information bits of the one or more CSI reporting settings. For example, if the coding rate is higher than a threshold, a WTRU may determine to report a subset of triggered CSI reporting settings. Furthermore, the coding rate may be based on the coding rate of UCI, wherein the UCI may be a nominal UCI based on triggered CSI reporting settings without subset section or determination by a WTRU.

Also, a trigger condition may be based on a number of parts for a CSI reporting. For example, if one or more of triggered CSI reporting settings includes two parts and the coding rate is higher than a threshold, a WTRU may skip reporting the triggered CSI reporting settings containing two parts while the WTRU may report one or more triggered CSI reporting settings containing one part.

Moreover, a trigger condition may be a number of PRBs scheduled. For example, if a number of PRBs scheduled is less than a threshold, a WTRU may determine to report a subset of triggered CSI reporting settings. Also, a trigger condition may be a number of layers for PUSCH transmission.

The subset of the triggered CSI reporting settings may be determined by a WTRU, based on priority rules or WTRU autonomous determination. For example, a CSI reporting setting including one CSI reporting type, for example, CRI may have a higher priority than another CSI reporting setting including other CSI reporting types, for example, PMI, CQI or RI. In another example, a CSI reporting setting associated with a resource setting for beam management may have a higher priority than another CSI reporting setting associated with another resource setting for CSI acquisition. A WTRU may drop reporting of one or more CSI reporting settings for lower priorities like the other CSI reporting types, for example, PMI, CQI or RI. The WTRU may also drop CSI acquisition while the WTRU is triggered to report one or more CSI reporting settings for high priorities such as a single CSI reporting type, for example, CRI and perform beam management.

The CSI reporting setting for beam management may be determined based on CSI reporting types or CSI-RS types. For example, if CRI or L1 Reference Signal Received Power (L1-RSRP) is included in a CSI reporting setting or if the associated CSI-RS types are beam management for a CSI reporting setting, the CSI reporting setting may be considered as or referred to as a CSI reporting setting for beam management. The priority rules may be based on the ordering of CSI reporting settings. For example, CSI reporting setting 0 may have a higher priority than CSI reporting setting 1. Then, a WTRU may drop a required number of CSI reporting setting from the last CSI reporting setting number, or vice versa. The priority rules may be based on the CSI reporting types included or configured for a CSI reporting setting. The priority rules may be configured via a higher layer signaling, for example MAC, RLC or PDCP signaling. For example, each CSI reporting setting may indicate the priority number. A lower priority number may have a higher priority than a higher priority number, or vice-versa.

With regard to WTRU autonomous determination, a WTRU may determine a subset of triggered CSI reporting settings, where the determined subset of triggered CSI reporting settings may be indicated to a gNB. For example, the selected subset of triggered CSI reporting may be indicated as a part of UCI.

In another example, a WTRU may determine a subset of CSI reporting types within a CSI reporting setting when one or more conditions are met. For example, one or more CSI reporting types, such as rank indicator (RI), wideband channel quality indicator (WB CQI), wideband pre-coding matrix indicator (WB PMI), sideband channel quality indicators (SB CQIs), sideband pre-coding matrix indicators (SB PMIs), CSI-RS resource indicator (CRI), may be configured in a CSI reporting setting. A WTRU may determine to report a subset of CSI reporting types, such as RI, CRI, WB CQI, WB PMI. The subset of CSI reporting types may be determined based on the priority rules of CSI reporting types, where RI/CRI may have a higher priority than CQI and PMI. In addition, WB CQI/PMI may have a higher priority than SB CQI/PMI.

In another example, a WTRU may determine a subset of time/frequency resources within a CSI reporting settings when one or more conditions are met. For example, one or more subband (SB) PMI/CQI reporting may be configured in a CSI reporting and if one or more conditions are met, a WTRU may report CSI for a subset of the subbands.

The subset of subbands may be determined based on measured CQIs for the subbands. In an example, the best Ms subbands which may have highest Ms CQI values may be selected or determined by the WTRU, wherein the value Ms may be determined based on one or more of following described below.

An Ms value may be determined based on a target coding rate of the CSI reporting. For example, a WTRU may determine a maximum Ms value of which coding rate may be equal to or lower than the target coding rate, which may be signaled via a higher layer signaling, for example MAC, RLC or PDCP signaling. The target coding rate may be based on the MCS level selected or indicated for an associated PUSCH transmission. The target coding rate may be indicated in the associated DCI for an aperiodic CSI reporting triggering.

Alternatively, the Ms value may be determined based on a CQI threshold. For example, one or more subbands of which CQI value is below a CQI threshold may not be reported or may be dropped for the CSI reporting, while one or more subbands of which CQI value is above a CQI threshold may be reported or selected as the subset of subbands. The CQI threshold may be configured, signaled, or determined based on at least one of higher layer signaling, an indicator in the associated DCI, or scheduling parameter(s) of the associated PUSCH transmission.

In an embodiment, the Ms value may be determined based on a delta CQI value of each subband, where the delta CQI value may be based on the difference of wideband (WB) CQI and the subband (SB) CQI. For example, one or more subbands having a delta CQI less than a predefined threshold may be selected or determined as the subset of subbands. The subbands may be determined based on a predefined rule. For example, CSIs for even numbered subbands may be selected as a subset when one or more conditions are met.

Figure 11:
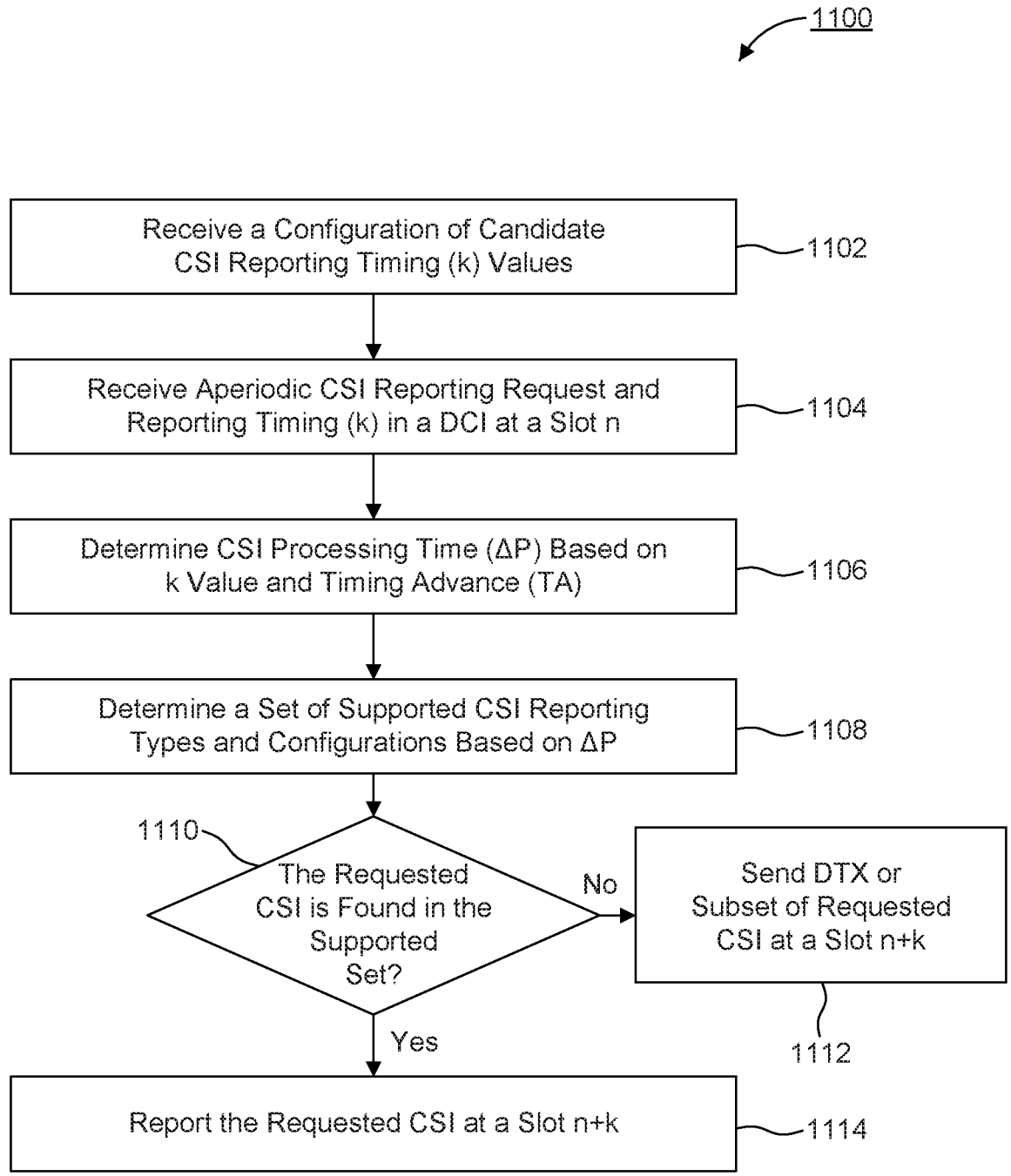
FIG. 11 illustrates an example flow diagram for a method for flexible CSI reporting, according to an embodiment.

FIG. 11 illustrates an example flow diagram 1100 for a method for reporting a requested CSI. In the example shown in FIG. 11, a WTRU may receive 1102 a configuration of candidate CSI reporting timing values. The timing values are denoted (k) and may be received via higher layer signaling, in one embodiment via RRC signaling. The WTRU may then receive 1104 an aperiodic CSI reporting request and reporting timing in a DCI at a slot n. The CSI processing time may be determined 1106 based on k and a TA corresponding to at least one TRP with which the WTRU is in communication with. The WTRU may determine 1108 a set of supported CSI reporting types and configurations based on the determined CSI processing time. The WTRU may determine 1110 whether the requested CSI is found in the set of supported CSI configurations. If it is, the WTRU may report 1114 the requested CSI at a slot denoted n+k. If, on the other hand, the requested CSI is not a member of the supported set, the WTRU should send DTX or a subset of the requested CSI at a slot n+k. The WTRU may completely drop a CSI transmission or transmit only the subset which is in accordance with what does exist in the set.

Figure 12:
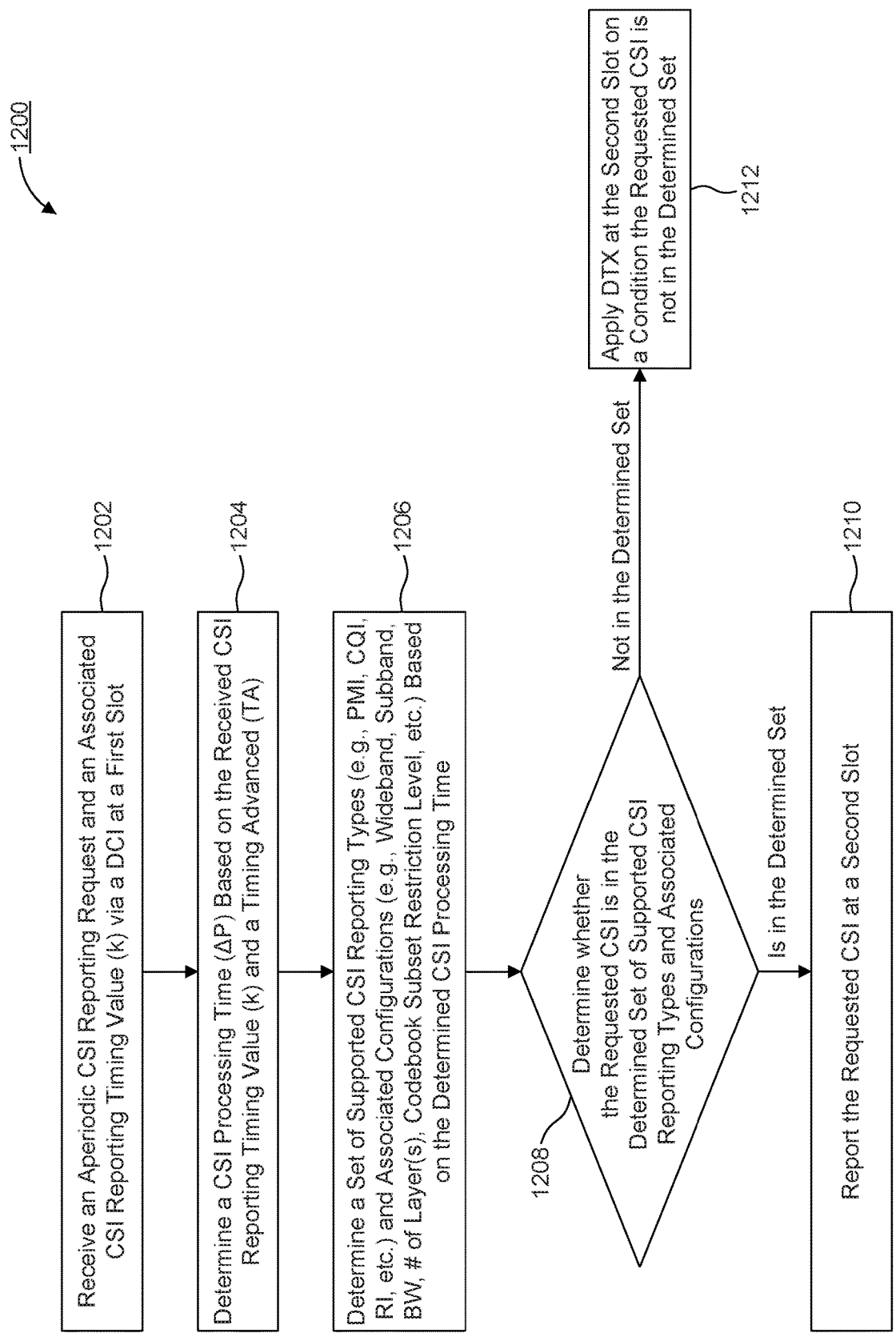
FIG. 12 illustrates another example flow diagram in which a determination is made based upon whether a requested CSI is within a supported set of CSI reporting types.

FIG. 12 illustrates an example flow diagram 1200 for a method for flexible CSI reporting, according to an embodiment. A WTRU may receive 1202 a configuration of candidate CSI reporting timing (k) values from a gNB. At a slot n, the WTRU receives 1204 an aperiodic CSI reporting request and CSI reporting timing (k) in a DCI transmitted by a gNB. Then, the WTRU determines 1206 CSI processing time ($\Delta P$) based on the k value and timing advance (TA). The WTRU subsequently determines a set of supported CSI reporting types and configurations based on the CSI processing time ($\Delta P$). If the WTRU finds the requested CSI in the supported set 1210, then the WTRU reports 1214 the requested CSI at a slot n+k. If WTRU does not find the requested CSI in the supported set, the WTRU sends 1212 a DTX or a subset of requested CSI at a slot n+k.

Figure 13:
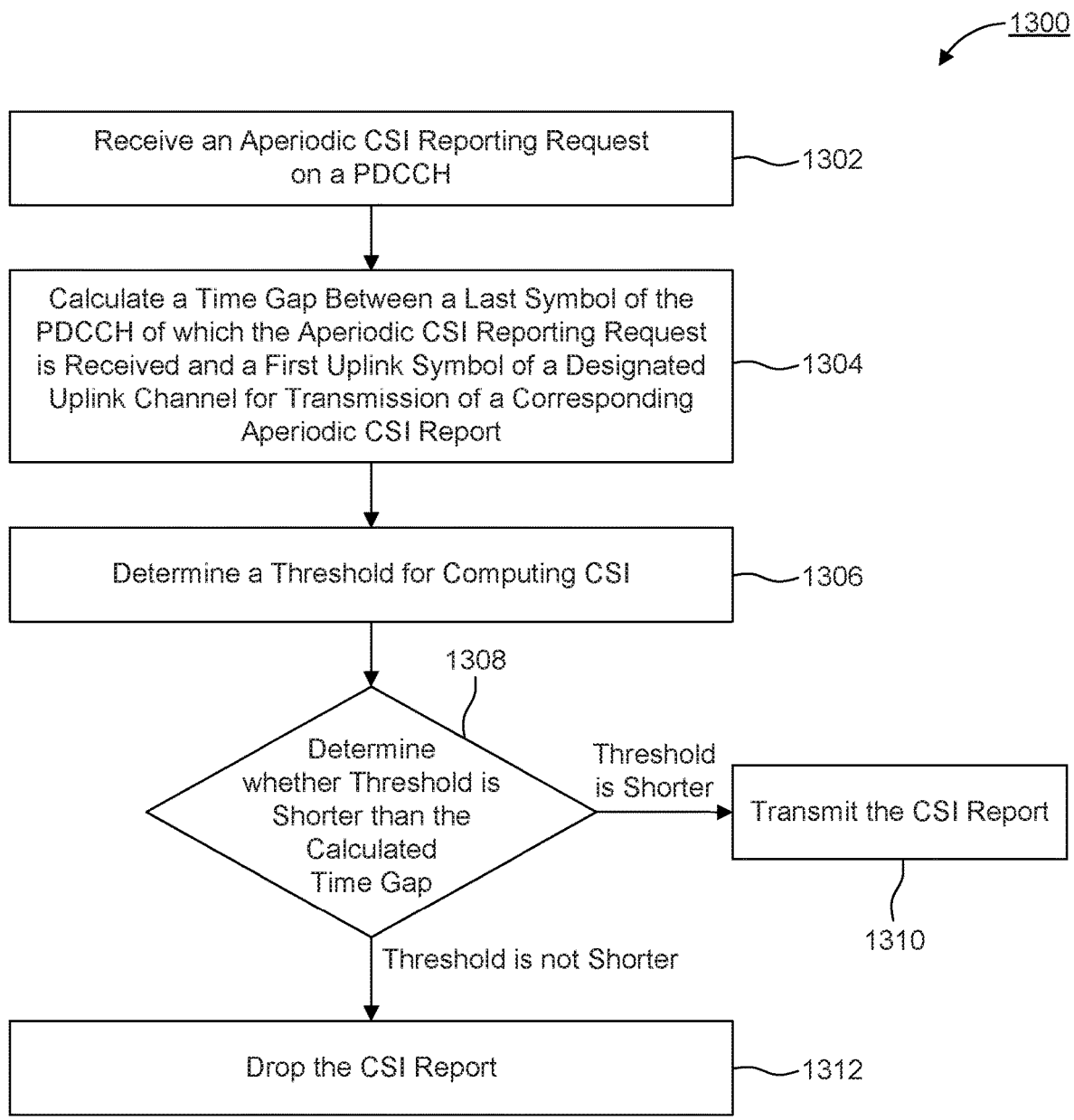
FIG. 13 illustrates yet another example flow diagram in which a determination is made based upon a length of a calculated time gap as compared to a CSI processing time.

FIG. 13 illustrates yet another example flow diagram 1300 in which a determination is made to report CSI based upon a length of a calculated time gap as compared to a threshold time period. An aperiodic CSI request may be received 1302 on a PDCCH. Upon receipt, a WTRU may calculate 1304 a time gap between a last symbol of the PDCCH for which the aperiodic CSI request was received and a first uplink symbol of a corresponding aperiodic CSI reporting transmission. The WTRU may determine 1306 a threshold, the threshold representing a length of time for which a CSI calculation may be processed and CSI determined. The WTRU may determine 1308 whether the threshold is shorter than the calculated time gap. If the threshold is shorter than the calculated time gap, a CSI report may be compiled and transmitted 1310. If the threshold is not shorter than the calculated time period, the WTRU may determine to drop the CSI report 1312, e.g. not transmit a CSI report.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) configured to transmit a channel state information (CSI) report, the WTRU comprising:
    a receiver configured to receive an aperiodic CSI reporting request on a physical downlink control channel (PDCCH);
    circuitry configured to:
        determine a time gap between a last symbol of the PDCCH of which the aperiodic CSI reporting request is received and a first uplink symbol of an uplink channel for transmission of a corresponding CSI report, wherein the determination of the time gap includes consideration of a timing advance value;
        determine a time threshold based on subcarrier spacing used by the WTRU; and
        determine whether the determined time threshold is shorter than the determined time gap; and
    a transmitter configured to:
        on a condition the determined time gap is not shorter than the determined time threshold, transmit the CSI report in response to the CSI reporting request,
    wherein, on a condition the determined time gap is shorter than the determined time threshold, transmission of the CSI report from the WTRU is not required, and
    wherein the transmitter is further configured, when the CSI report is not transmitted and even when a Hybrid Automatic Repeat request (HARQ) ACK (Acknowledgement) would have been multiplexed on the uplink channel with the CSI report in a case where the determined time gap is not shorter than the time threshold, to:
        not transmit the CSI report; and
        transmit the HARQ ACK.

2. The WTRU of claim 1, wherein the time threshold is determined based on a CSI reporting bandwidth.

3. The WTRU of claim 1, wherein the time threshold is determined based on a number of antenna ports.

4. The WTRU of claim 1, wherein the time threshold is determined based on a number of antenna ports corresponding to a wideband frequency bandwidth.

5. The WTRU of claim 1, wherein the time threshold is determined based on a codebook type.

6. The WTRU of claim 1, wherein the uplink channel is one of a physical uplink shared data channel (PUSCH) and a physical uplink control channel (PUCCH).

7. A method performed by a wireless transmit/receive unit (WTRU), the method comprising:
    receiving an aperiodic channel state information (CSI) reporting request on a physical downlink control channel (PDCCH);
    determining a time gap between a last symbol of the PDCCH of which the aperiodic CSI reporting request is received and a first uplink symbol of an uplink channel for transmission of a corresponding CSI report, wherein the time gap is determined based on a timing advance value;
    determining a time threshold based on subcarrier spacing used by the WTRU;
    determining whether the determined time gap is shorter than the determined time threshold; and
    transmitting, on a condition the determined time gap is not shorter than the determined time threshold, the CSI report in response to the CSI reporting request;
    wherein, on a condition the determined time gap is shorter than the time threshold, transmission of the CSI report from the WTRU is not required, and
    wherein, when the CSI report is not transmitted and even when a Hybrid Automatic Repeat request (HARQ) ACK (Acknowledgement) would have been multiplexed on the uplink channel with the CSI report in a case where the determined time gap is not shorter than the time threshold:
        not transmitting the CSI report; and
        transmitting the HARQ ACK.

8. The method of claim 7, wherein the time threshold is determined based on a granularity of feedback to be reported.

9. The method of claim 7, wherein the time threshold is determined based on a Type I single panel codebook.

10. The method of claim 7, wherein the CSI report includes CSI corresponding to a wideband frequency granularity.

11. The method of claim 7, wherein the CSI report includes CSI corresponding to a maximum of 4 CSI-RS ports.

12. The method of claim 7, further comprising:
    receiving one or more parameters related to the determination of the time threshold, via radio resource control (RRC) signaling.

13. A radio communication apparatus comprising:
    a radio transceiver; and
    circuitry configured to:
        transmit, to a transmit/receive unit (WTRU) via the radio transceiver, an aperiodic channel state information (CSI) report request on a physical downlink control channel (PDCCH); and
        on a condition a time gap which is determined by the WTRU is not shorter than a time threshold, receive the CSI report from the WTRU via the radio transceiver in response to the CSI reporting request,
    wherein the time gap is between a last symbol of the PDCCH of which the aperiodic CSI reporting request is received by the WTRU and a first uplink symbol of an uplink channel for transmission of a corresponding CSI report from the WTRU, wherein the time gap includes consideration of a timing advance value, wherein the time threshold is based on subcarrier spacing used by the WTRU, and wherein the circuitry is further configured, when the time gap is shorter than the time threshold and even when a Hybrid Automatic Repeat reQuest (HARQ) ACK (Acknowledgement) would have been multiplexed on the uplink channel with the CSI report in a case where the determined time gap is not shorter than the time threshold, to:

not receive the CSI report; and receive the HARQ ACK.

14. The radio communication apparatus of claim 13, wherein the radio communication apparatus is a gNB or one of multiple network elements included in the gNB.

15. A method for a radio communication apparatus, a method comprising:

transmitting, to a transmit/receive unit (WTRU), an aperiodic channel state information (CSI) report request on a physical downlink control channel (PDCCH); and on a condition a time gap which is determined by the WTRU is not shorter than a time threshold, receive the CSI report from the WTRU in response to the CSI reporting request, wherein, on a condition the time gap is shorter than the time threshold, reception of the CSI report is not required, wherein the time gap is between a last symbol of the PDCCH of which the aperiodic CSI reporting request is received by the WTRU and a first uplink symbol of an uplink channel for transmission of a corresponding CSI report from the WTRU, wherein the time gap includes consideration of a timing advance value, wherein the time threshold is based on subcarrier spacing used by the WTRU, and wherein, when the time gap is shorter than the time threshold and even when a Hybrid Automatic Repeat request (HARQ) ACK (Acknowledgement) would have been multiplexed on the uplink channel the CSI report in a case where the determined time gap is not shorter than the time threshold:

not receiving the CSI report; and receiving the HARQ ACK.

16. The method of claim 15, wherein the radio communication apparatus is a gNB or one of multiple network elements included in the gNB.

* * * * *